United States Patent [19]

Ishimura et al.

[11] Patent Number: 4,887,119
[45] Date of Patent: Dec. 12, 1989

[54] PHOTOGRAPHIC CAMERA SYSTEM

[75] Inventors: Toshihiko Ishimura, Habikino; Kenji Tsuji, Kashiwara; Nobuyuki Taniguchi, Nishinomiya; Hiroshi Ootsuka, Sakai, all of Japan

[73] Assignee: Minolta Camera Kabushiki Kaisha, Osaka, Japan

[21] Appl. No.: 211,176

[22] Filed: Jun. 23, 1988

Related U.S. Application Data

[63] Continuation of Ser. No. 912,377, Sep. 29, 1986, abandoned.

[30] Foreign Application Priority Data

Sep. 30, 1985 [JP] Japan ................................ 60-218761
Oct. 3, 1985 [JP] Japan ................................ 60-220997

[51] Int. Cl.⁴ ........................................... G03B 15/05
[52] U.S. Cl. ................................... 354/413; 354/416; 354/421; 354/127.13
[58] Field of Search ............... 354/415, 416, 417, 418, 354/421, 475, 127.1, 127.13

[56] References Cited

U.S. PATENT DOCUMENTS

| | | | |
|---|---|---|---|
| 4,258,991 | 3/1981 | Kuraishi | 354/127.13 |
| 4,297,011 | 10/1981 | Adams, Jr. | 354/127.13 |
| 4,494,851 | 1/1985 | Maida et al. | 354/424 |
| 4,558,939 | 12/1985 | Taniguchi et al. | 354/416 |
| 4,695,148 | 9/1987 | Terui et al. | 354/416 |

Primary Examiner—Russell E. Adams
Attorney, Agent, or Firm—Burns, Doane, Swecker & Mathis

[57] ABSTRACT

A photographic camera system having a camera and an electronic flash device detachably attached to the camera. The electronic flash device includes an operational member for outputting a control signal in response to a manual operation and a first group of terminals for electrically connecting the electronic flash device to the camera and for providing a control signal therethrough. The camera includes a second group of terminals electrically connected to the first group of terminals, an input section for inputting the control signal through the second group of terminals, a circuitry for carrying out preparatory operation for a photography, and a control circuitry for energizing the circuitry in response to an input of the control signal to the input section.

12 Claims, 23 Drawing Sheets

Fig. 11

Fig. 15a
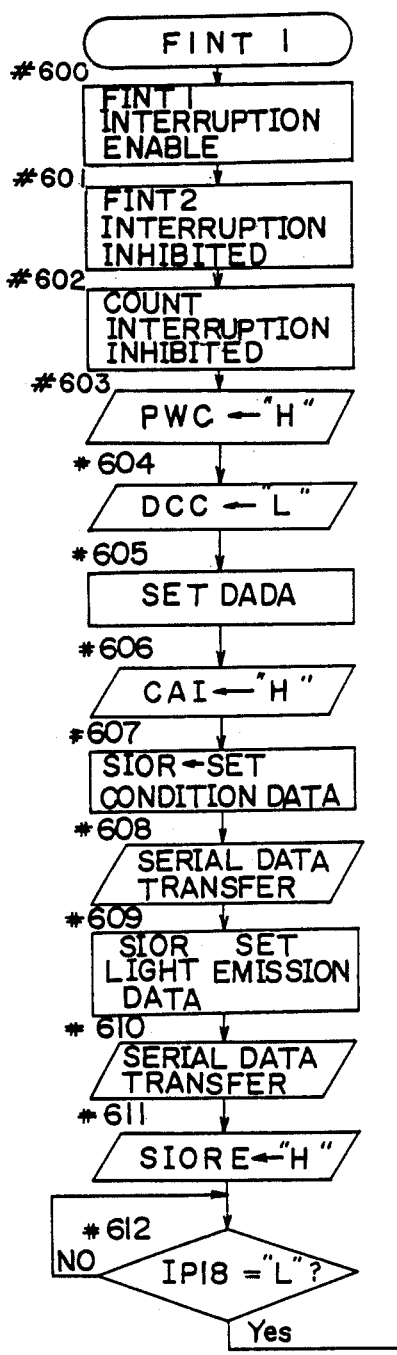
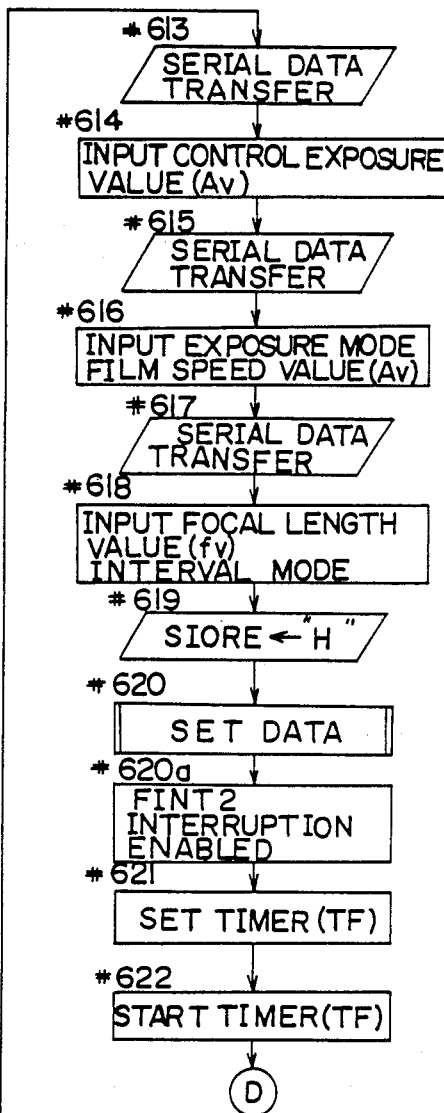

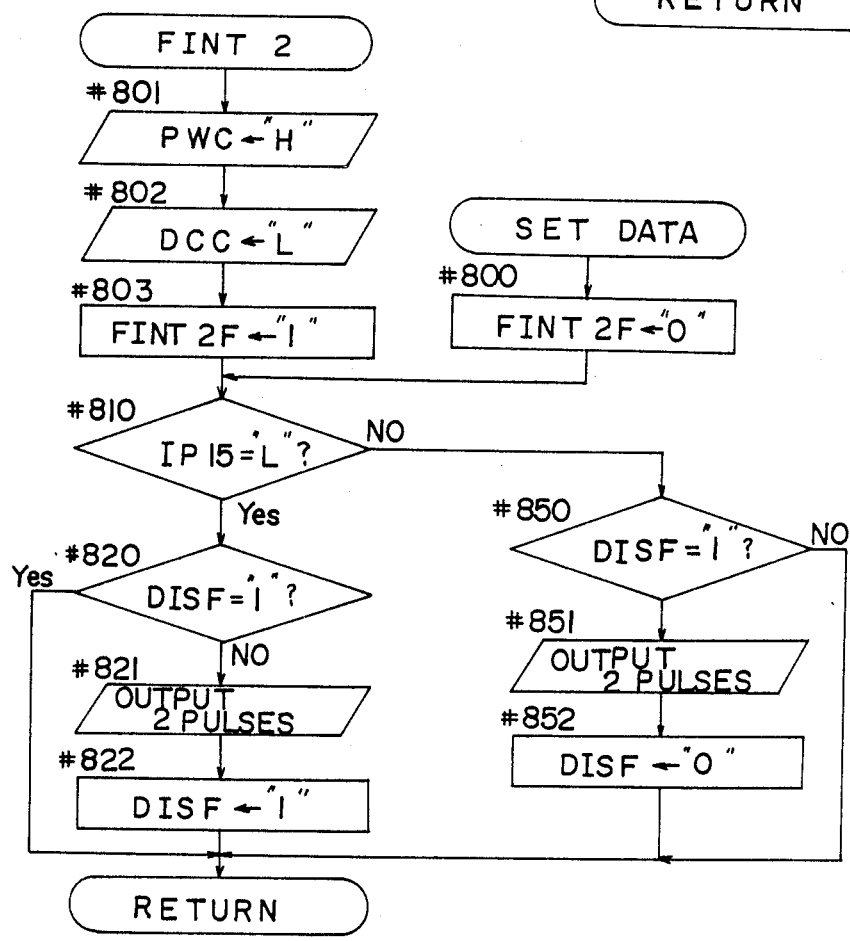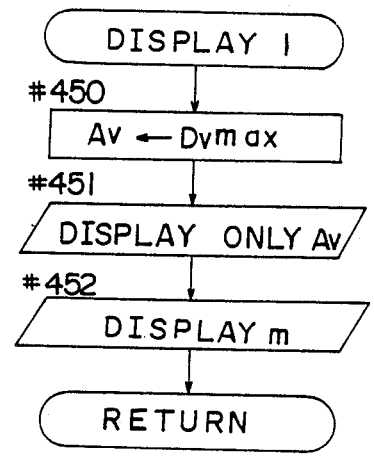

PHOTOGRAPHIC CAMERA SYSTEM

This application is a continuation, of application Ser. No. 912,377, filed Sept. 29, 1986 now abandoned.

BACKGROUND OF THE INVENTION

1. Field of the Invention

The present invention relates to a photographic camera system including a main camera body and an electronic flash device detachably attached to the main camera body, and more particularly to a start control of the system.

2. Description of the Prior Art

With an increasing systematization of the photographic camera in recent years, the photographic camera and the electronic flash device are more and more closely interconnected with each other. For instance, a U.S. patent application published under U.S. Pat. No. 4,436,396 teaches a photographic camera system in which when the camera is supplied with power from a battery incorporated in the camera a signal indicating the power supply to the camera is provided to the electronic flash device and based on this signal power is supplied also from a flash battery incorporated in the electronic flash device to circuits of the electronic flash device whereby the flash device starts preparatory operation for a flash photography. That is to say, according to this known photographic camera system, the power supply indicating signal is used as a trigger signal for starting, e.g. a voltage boosting circuit including in the electronic flash device and the preparatory operation for a flash photography is started simultaneously with the power supply to the camera. In practice, however, a flash photography is not necessarily carried out when the electronic flash device is attached to the camera. Therefore, according to the above-described start control for a photographic camera system, when the flash photography is not carried out, the battery power used for the preparatory operation of the electronic flash device is only wasted.

There is another known photographic camera system in which a unidirectional or bidirectional information transfer is carried out between the camera and the electronic flash device whereby based on the information predetermined flash photography data are calculated. According to this system also, the aforementioned problem occurs as long as the electronic flash device, i.e. the preparatory operation is started simultaneously with the power supply to the camera.

SUMMARY OF THE INVENTION

Therefore, it is an object of the present invention to provide a photographic camera system including the camera and the electronic flash device in which the preparatory operation for a flash photography is started efficiently without wasting the power.

It is another object of the present invention to provide a photographic camera system carrying out a flash photography based on the bidirectional information transferred between the camera and the electronic flash device wherein the preparatory operation for a flash photography is started efficiently without wasting the power.

It is still another object of the present invention to improve the processing of the information bidirectionally transferred between the camera and the electronic flash device.

One of the foregoing objects is accomplished in one embodiment by providing a photographic camera system comprising the electronic flash device detachably attached to a camera body and including operational means for outputting a control signal in response to a manual operation and a first terminal for electrically connecting the electronic flash device to the camera body and for providing a control signal therethrough, and further comprising the camera body including a second terminal electrically connected to the first terminal, input means for inputting the control signal through the second terminal, a circuitry for carrying out preparatory operation for a photography and control means for energizing the circuitry in response to an input of the control signal to the input means.

According to this structure, the start signal is provided to the main camera body in response to the manual operation to the electronic flash device and this start signal, at the same time, starts the circuitry included in the main camera body whereby the preparatory operation is started. This permits an operator to know from the circuitry, e.g. a display device of the main camera body the photographic information at the moment of the operation only by manually operating the electronic flash device.

BRIEF DESCRIPTION OF THE DRAWINGS

These and other features and advantages of the invention will be understood from the following written description, taken in conjunction with the drawings, in which:

FIGS. 11(A)-11(E) are diagrams showing operation of a LCD display according to subroutines described in the flow charts of FIGS. 3-10;

FIGS. 15a-15c are flow charts showing operation in response to the application of an interruption signal through an interruption input terminal;

FIG. 20 is a flow chart showing a data setting subroutine for the embodiment of FIG. 19;

FIG. 21 is a flow chart including a modification of a display subroutine;

DESCRIPTION OF THE PREFERRED EMBODIMENTS

Embodiments of the present invention will be particularly described hereinafter with reference to the accompanying drawings.

Figure 2A:
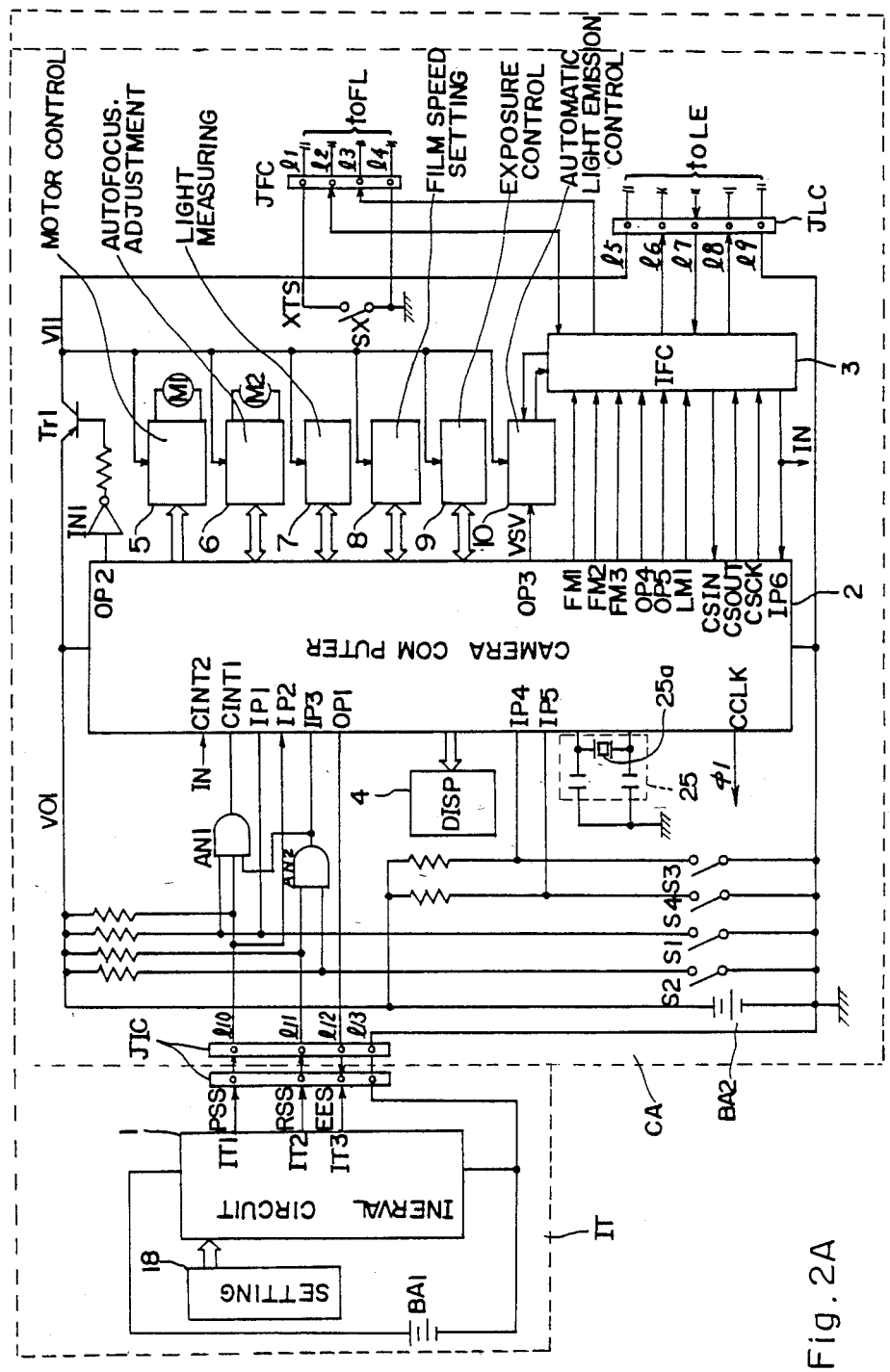
FIGS. 2A and 2B are circuit diagrams of a photographic system according to the present invention.
Figure 2B:
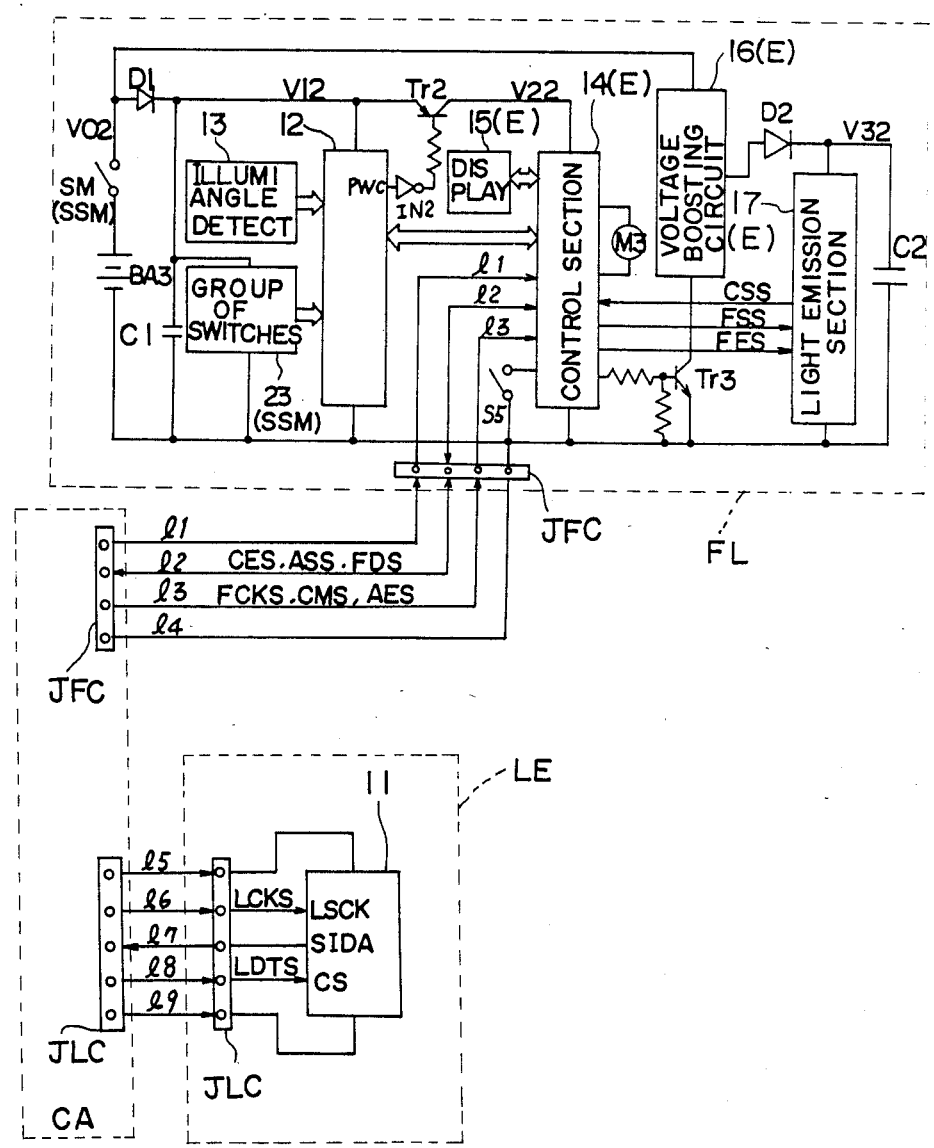

FIGS. 2A and 2B are a diagram of a circuitry constituting the whole system.

This system comprises an interval device IT for carrying out photographic operations in a certain cycle, a camera body CA with a focal plane shutter mechanism, an exchangeable photographic lens LE having functions of varying a focal length thereof, and an electronic flash device FL detachable to the camera body CA. The interval device IT, the photographic lens LE and the electronic flash device FL are respectively connected through connecting portions JIc, JLc, JFc to the camera body CA.

The interval device IT by way of example of an interval controller includes a battery BA1, a setting section 18, an interval circuit 1 for providing and receiving signals to and from the camera body CA based on a setting made by the setting section 18, and the like. This internal device IT is integrated into a rear lid of the camera body for instance and is electrically connected to the camera body CA when the rear lid is closed. The setting section 18 is capable of setting cycle time, number, starting time of the photography and the like.

The interval circuit 1, in a predetermined cycle set by the setting section 18, switches an output terminal IT2 to 'Low' (hereinafter referred to as 'L') and then provides a release signal RSS of 'L' through a signal line l11 to the camera body CA. When the photographing cycle is longer than 1 minute, an output terminal IT1 is switched to 'L', one minute before the release signal RSS is output, or when the photographing cycle is shorter than one minute, the output terminal IT1 is switched to 'L' immediately after the photographing operation, whereby a light measurement start signal PSS of 'L' pulse is provided through a signal line 10 to the camera body CA.

When an exposure in the camera body, i.e. the photography operation is completed, an exposure completion signal EES, which is maintained at 'H' for a predetermined time period is provided through a signal line l12 into an input terminal IT3 of the interval circuit 1 thereby to switch the output terminal IT2 to 'H'.

Thus, a photography operation of one frame controlled by the interval device IT is completed. Thereafter, in the same manner as above, the operation is serially carried out for the number of photography set by the setting section 18 as the signals are provided to and from the camera body CA.

A control circuitry in the camera body CA will be described hereinafter.

This control circuitry in the camera body CA includes a battery BA2 as a power source, a microcomputer 2 will be referred to as camera computer hereinafter), an interface circuit 3, a display device 4, a motor control circuit 5, an autofocusing adjustment circuit 6, a light measuring circuit 7, a film speed setting circuit 8, an exposure control circuit 9, an automatic light emission control circuit 10, and so on.

The camera computer 2 controls the respective components of the camera body CA and the overall functioning of the system. The interface circuit 3 adjusts signals provided between the circuits (mainly the camera computer 2) of the camera body CA and the photographic lens LE, and the electronic flash device FL. The display device 4 directly controlled by the camera computer 2 includes liquid crystal display (hereinafter referred to as LCD) panel and displays the film speed value, the exposure control data, and the photographic information about a number of film frames already exposed and so on. The motor control circuit 5 controls a motor M1 for winding-up and rewinding the film and for cocking a shutter mechanism. The autofocus adjustment device 6 detects a distance to an object to be photographed or a focusing condition of the photographic lens and then based on the detection result controls a motor M2 for moving a focusing lens of the photographic lens LE thereby to carry out an automatic focus adjustment. The light measuring circuit 7 detects a brightness of an object to be photographed. The film speed setting circuit 8 decodes automatically a film speed code (DX code) provided on a film cartridge or reads a film speed manually set by means of a film speed setting dial (not shown) and then outputs the film speed information to the camera computer 2. The exposure control circuit 9 controls a diaphragm aperture and a shutter speed based on signals from the camera computer 2. The automatic light emission control circuit 10 receives the light coming from an object to be photographed, passing through the photographic lens LE and its diaphragm aperture and reflected by the film plane, detects amount of light fired from the electronic flash device FL, and based on the detection result controls the light emission quantity of the electronic flash device FL Among the components of the camera body CA, the camera computer 2, the display device 4, the interface circuit 3, AND gates AN1, AN2 and an inverter IN1 are supplied with a power of voltage V01 directly from the battery BA2. Whereas, the rest of the circuitry are supplied with a power of voltage V11 through a power supply transistor Tr1. This power supply transistor Tr1 is turned 'ON' and 'OFF' by signals output through the inverter IN1 from the output terminal OP2 of the camera computer 2.

The motor control circuit 5, the autofocus adjustment device 6, the light measuring circuit 7 and the exposure control circuit 9 are provided with a clock signal $\phi 1$ output from an output terminal CCLK of the camera computer 2 whereby these circuits and device carry out respective functions thereof based on this clock signal $\phi 1$.

A control circuitry of the electronic flash device FL will be described next.

This control circuitry includes a battery BA3 as a power source, a microcomputer 12 (will be referred to as flash computer hereinafter), a control section 14 having a 'hardware' type structure, an illumination angle detecting circuit 13, a display section 15, a voltage boosting circuit 16, a light emitter 17, a group of switches 23 and the like.

The flash computer 12 and the control section 14 control the functioning of the electronic flash device FL. This electronic flash device FL, as will be more particularly described later, is capable of varying the illumination angle to meet a view angle corresponding to a focal length of the photographic lens LE. The illumination angle detecting circuit 13 detects the illumination angle of the electronic flash device FL meeting the view angle of the photographic lens LE corresponding to the focal length thereof and then outputs the result data in two bits to the flash computer 12. The display section 15 displays by means of LED-s various modes such a completion of light emission con by the automatic light emission control circuit 10 of the camera body CA, a completion of charging of a main capacitor C2 and a change of the illumination angle described hereinbefore independently. The voltage boosting circuit 16, which is controlled by a voltage boosting control transistor Tr3 turned 'ON' 'OFF' by signals output from the flash computer 12 through the control section 14, boosts the original power source of V02 up to a voltage V32 needed for a flash light emission. The light emitter 17 emits and stops the flash light and at the same time checks a charging condition of the main capacitor C2 for accumulating energy needed for generating the flash light. The group of switches 23 include a plurality of switches for setting various kinds of data.

The components of the control circuitry of the electronic flash device FL except the control section 14 and the display section 15 are supplied with a power of voltage V12 through a main switch SM and a diode D1, whereas the control section 14 and the display section 15 are supplied with a power of voltage V22 through a power supply transistor Tr2 which i turned 'ON' and 'OFF' by signals output through an inverter IN2 from an output terminal PWC of the flash computer 12.

Referring to the same figure, a reference mark D1 denotes a reverse charging prevention diode, D2 denotes a rectifier diode, C1 denotes a capacitor having a large capacity and adapted for preventing an erroneous function of the flash computer 12 resulting from a power reduction in the course of the operation by the voltage boosting circuit 16, M3 denotes a motor for varying the illumination angle and S5 denotes a switch for a test light emission The construction and the functions of the electronic flash device FL will be more particularly described later.

Signal lines 11 through 19 for providing and receiving signals between the photographic lens LE, the electronic flash device FL and the camera body CA will be described next Firstly, the signal lines 15 through 19 for providing and receiving signals between the photographic lens LE and the camera body CA will be described.

The signal line 15 is adapted for supplying power to a lens circuit 11 in the photographic lens LE and is provided with power from a collector side of the power supply transistor Tr1 of the camera body CA. The signal line 16 is adapted for transferring a lens data transfer clock signal LCKS used for a serial data transfer from the camera body CA to the photographic lens LE. The signal line 17, which is also adapted for serial data, transfer, serially transfers therethrough data from the lens circuit 11 to the camera body CA based on the above clock signal CLKS transferred from the camera body CA. The signal line 18 is adapted for transferring a data transfer start signal LDTS in the state of 'H' which is output from the camera body CA at the start of the above serial data transfer. The signal line 19 is adapted for a grounding.

The signal lines 11 through 14 for providing and receiving signals between the electronic flash device FL and the camera body CA will be described next.

The signal line 11 is adapted for transferring a synchronous signal XTS for a flash light emission, and through which the synchronous signal XTS in the state of 'L' is transferred from the camera body CA to the electronic flash device FL when an X contact or flash synchronization switch SX is closed with a completion of the travel of the preceding shutter curtain.

The signal line 12 is used as a bidirectional data transfer bus during the serial data transfer between the camera body CA and the electronic flash device FL. The signal line 12 is further used for transferring from the electronic flash device FL to the camera body CA a light emission start signal ASS during an exposure control operation, a flash display start signal FDSS for displaying flash photography information of the electronic flash device FL on the display device 4 of the camera body CA and a flash display stop signal FDES to the camera body CA.

This signal line 12 is still further used for transferring a charging completion signal CES in the state of 'H' upon a completion of charging of the main capacitor C2 of the electronic flash device FL This signal CES is transferable even if an electronic flash device attached to the camera body CA is not capable of the data transfer between the camera body CA and the same.

The signal line 13 is adapted for transferring a camera mode signal CMS indicating an operation mode of the camera body CA. In a mode (will be referred to as FC mode hereinafter) for data transfer from the electronic flash device FL to the camera body CA, the camera mode signal CMS in the state of 'H' is transferred from the camera body CA to the electronic flash device FL for a time period T1 to indicate the start of this mode. Similarly, in a mode (will be referred to as CF mode hereinafter) for data transfer from the camera body CA to the electronic flash device FL, the signal in the state of 'H', and in a mode (will be referred to as EC mode hereinafter) for an exposure control, i.e. a diaphragm aperture control and a shutter speed control triggered by a shutter release operation, the signal in the sate of 'H' are transferred from the camera body CA to the electronic flash device FL, respectively for a time period T2 and for a time period T3.

This signal line 13, in the data transfers (the FC mode and the CF mode), is also used for transferring a flash data transfer clock signal FCKS output from the camera computer 2 and is further used for transferring a light emission control completion signal AES in the state of 'H' The signal line 14 is adapted for a grounding.

Switches S1 through S4 provided to the camera body CA will be described next.

A reference mark S1 denotes a light measuring switch for starting a light measuring operation and is closed by depressing of a shutter release button (not shown) to the first stage, whereby as described later the camera computer 2 is interrupted to start predetermined functioning.

A reference mark S2 denotes a release switch and is closed when the shutter release button is depressed to the second stage, whereby the exposure control is started.

A reference mark S3 denotes a switch for indicating a completion of exposure and is opened with a completion of a shutter cocking and is closed with a completion of exposure. A reference mark S4 denotes a switch for indicating a completion of one-frame winding-up operation of the film and is opened with a shutter release operation and is closed with the completion of one-frame winding-up of the film by the motor M1.

A reference numeral 25 denotes a reference pulse generating circuit having a crystal oscillator 25a.

A functioning of the control circuitry of the camera body constructed as described above will be particularly described hereinafter with reference to a flow chart in FIGS. 3 through 10.

It is to be noted that the camera described in this embodiment is operable only in a programmed automatically exposure control mode in which the camera computer based on the light measurement automatically determines the diaphragm aperture and the shutter speed. Also, it is assumed that the camera computer 2 is already supplied with power upon loading of the camera battery BA2 and that the camera computer 2 is in halt state after reset terminals of respective register incorporated therein are reset.

In this condition, if the light measuring switch S1 is closed or if a release signal RSS output from the interval device IT or a light measurement operation start signal PSS preceding thereto in the state of 'L' is input to the camera body CA, an output signal from the AND gate AN1 falls from 'H' to 'L'. This signal is input to an interruption input terminal CINT1 of the camera computer 2 and the camera computer 2 carries out the flow shown in FIGS. 3A through 3C in response to this falling at the terminal CINT1.

Also, as a flash display start signal FSDD for permitting the display device 4 of the camera body CA to display the flash photography information is input to the camera body CA, an interruption signal IN is output from the interface circuit 3. When this interruption signal IN is input to an interruption input terminal CINT2 also, the camera computer 2 also carries out the flow shown in FIGS. 3A through 3C.

When the interruption at either the interruption input terminal CINT1 or CINT2 takes place and the flow starts, at step #1a the camera computer 2 inhibits the interruptions to the interruption input terminals CINT1 and CINT2. At step #1b, it is judged whether the light measuring switch S1 is closed or not. If so, an S1 flag S1F is set at step #1c. If the switch S1 is judged to be opened, this flag S1F is reset at #1d. At step #2a, an output terminal OP2 is switched to 'H'. The output signal from this output terminal OP2 is reversed by means of the inverter IN1 to be 'L' thereby to turn 'ON' the power supply transistor Tr1 to start power supply to the respective components of the control circuitry. The camera computer 2 resets a timer TC integrated thereinto to start counting or measuring time at steps #2b and #2c and then outputs the light measuring operation start signal to the light measuring circuit 7 to start the light measuring operation at step #3.

At step #4, a counter DC for counting a number of data transfers to be carried out is reset and an output terminal LM1 is switched to 'H' to carry out a serial data transfer with the photographic lens LE, whereby the data transfer start signal LDTS in the state of 'H' is output through a signal line 18. The camera computer 2, after outputting this signal LDTS, outputs the lens data transfer clock signal LCKS including eight pulses through the signal line 16. The photographic lens LE outputs one-byte data synchronously with rising of respective pulses through the signal line 17 to the camera body CA, whereby the camera computer 2 inputs this data synchronously with a fall of the respective pulses. This process is repeated for the number of times corresponding to the number of pulses, i.e. eight times whereby one-byte data transfer is completed. At step #6, the camera computer 2 inputs this one-byte data to a predetermined register thereby to complete one serial data transfer. AT steps #7 and #8, this serial data transfer is repeated for a predetermined number of times X. When the number of this data transfer reaches X, the output terminal LM1 is switched to 'L' to indicate the completion of the serial data transfer with the photographic lens LE.

The data input from the photographic lens LE in this serial data transfer includes information about a full open diaphragm aperture value Avo of the photographic lens LE, a diaphragm aperture value of the minimum diaphragm aperture Avmax of the same, a focal length value fv of the same and a lens mounting condition for showing whether the photographic lens LE is mounted or not.

At step #10, the camera computer 2 checks a condition of an input terminal IP1 which is directly connected to the light measuring switch S1. If this input terminal IN1 is judged to be in the state of 'L', the camera computer 2 determines that an interruption at the interruption input terminal CINT1 has taken place as the light measuring switch S1 is closed, and outputs a signal to start the autofocusing operation at step #11. If the input terminal IP1 is judged to be in the state of 'H' as the light measuring switch S1 is opened, the camera computer 2 thus determines that the autofocusing operation is not needed and then outputs a signal to stop autofocusing operation at step #12.

Thereafter, at step #13, an output terminal FM2 is switched to 'H' to carry out a serial data transfer with the electronic flash device FL. At step #14, the output terminal FM1 is maintained at 'H' for the time period T1, whereby the camera mode signal CMS in the state of 'H' is output through the signal line 13 to the electronic flash device FL for the time period T1 thereby to indicate to the electronic flash device FL that the process is in the FC mode for the data transfer from the electronic flash device FL to the camera body CA.

At steps #15 and #16, this data transfer is repeated two times in the same manner as the serial data transfer with the photographic lens LE carried out at the aforementioned step #6. And at step #17, the output terminal FM2 is switched to 'L' to indicate the completion of the serial data transfer with the electronic flash device FL.

Contents of this data are shown in the following Table 1. The data represented by each bit will be described next. It is to be noted here that two serial data transfers transfer data corresponding to 16 bits of data in total and the data transferred by the first serial data transfer are indicated in the bits in the lower order whereas those transferred by the second serial data transfer are indicated in the bits in the higher order.

TABLE 1

| bit | name of data | contents of data |
| --- | --- | --- |
| b0 | mounting condition | H . . . mounted |
| b1 | first type identification | L . . . data transfer type |
| b2 | spare | L . . . normal |
| b3 | charging condition | H . . . charging completed |
| b4 | light emission control condition | L . . . light emission control completed |

TABLE 1-continued

| bit | name of data | contents of data |
|---|---|---|
| | | (FDC signal) |
| b5 | second type identification | H ... camera display type |
| b6 | spare | |
| b7 | spare | |
| b8 | light emission quantity | LL ... full light |
| b9 | | LH ... ½ light |
| | | HL ... ¼ light |
| | | HH ... ⅛ light |
| b10 | spare | L ... normal |
| b11 | illumination angle data (zoom type) | LL ... fv = 28 mm |
| b12 | | LH ... fv = 35 mm |
| | | HL ... fv = 50 mm |
| | | HH ... fv = 70 mm |
| | maximum light emission quantity (non-zoom type) | LL ... Iv = 3 (GN = 16) |
| | | LH ... Iv = 4.5 (GN = 26) |
| | | (ISO 100) |
| b13 | illumination mode | H ... TTL automatic light emission control mode |
| | | L ... manual illumination mode |
| b14 | display unit | H ... meter (m) |
| | | L ... feet (feet) |
| b15 | third type identification | H ... zoom type |

The bit b0 shows a mounting condition of the electronic flash device FL and is in the state of 'H' when the device FL is mounted to the camera body CA with its main switch SM closed.

The bit b1 is an identification bit for indicating whether the electronic flash device FL is of a type (this type will be hereinafter referred as data transfer type) capable of the serial data transfer with the camera body CA or not. That is to say, even with a conventional electronic flash device FL which is not capable of the serial data with the camera body CA, the signal in the state of 'H', as described hereinbefore, is output through the signal line 12 when the charging is completed, therefore in order to distinguish from this conventional type, this bit b1 is set to 'L' in the data transfer type electronic flash device FL. The bit b2 is a spare bit and is normally set to 'L'. The bit b3 is adapted for showing a charging condition of the main capacitor C2 and is set to 'H' when the main capacitor C2 has charged above a given level. The bit b4 is adapted for indicating a light emission control condition and is set to 'L' with a completion of a proper flash light control in response to a flash interruption signal to provide a light emission control completion signal FDC.

The bit b5 is a second identification bit. If the electronic flash device FL does not include the display device such as LCD and is to be capable of outputting the above flash photography information to the display device 4 of the camera body CA is adapted for displaying the information instead thereof (this type of electronic flash device will be referred to as camera display type hereinafter), this bit b5 is set to 'H'.

The bits b6 and b7 are spare bits and are normally set to 'L'.

The data indicated by the above eight bits b0 through b7 are transferred from the electronic flash device FL to the camera body CA in the first data transfer at step #15.

The bits b8 and b9 indicate a light emission quantity in two bits. More particularly, in accordance with a light emission quantity manually set by a light emission quantity change switch attached to the electronic flash device FL, these bits are set to 'LL' in a full light emission condition, to 'LH' in a ½ light emission condition, to 'HL' in a ¼ light emission condition and to 'HH' in a ⅛ light emission condition, respectively. The bit b10 is a spare bit and is normally set to 'L'. For carrying out the light emission control operation in a greater precision, i.e. in a 1/16 or a 1/32 condition for instance, this bit b10 may be used in addition to the bits b8 and b9.

The bits b11 and b12 indicate in two bits data about an illumination angle which meets a view angle corresponding to a focal length value fv of the photographic lens LE in case the electronic flash device FL is of a type capable of automatically varying the illumination angle in response to the focal length value fv of the photographic lens LE this type of electronic flash device FL will be hereinafter referred to as zoom type). For instance, if the illumination angle meets the focal length value fv=28 mm, these bits are set to 'LL'. In the same way, the bits are set to 'LH' in case fv=35 mm, to 'HL' in case fv=50 mm, and to 'HH' in case fv=70 mm, respectively.

If the electronic flash device FL is not the zoom type, these bits b11 and b12 indicate in two bits a maximum light emission quantity corresponding to a maximum guide number. For instance, if the guide number is 16 for an ISO speed 100 of the film (if represented as a light emission quantity value Iv in the same system as the APEX system, Iv=3) the bits are set to 'LL' and if the guide number is 26 (if represented as the light emission quantity in the above system, Iv=4.5), the bits are set to 'LH', respectively.

The bit b13 indicates whether the mode is a TTL automatic light emission control mode or a manual illumination mode and is set to 'H' in the TTL automatic light emission control mode. The bit b14 shows an indication unit which indicates a flash distance, either by the feet or by the meter, and is set to 'H' when the flash distance is to be indicated in the meter. The bit b15 is a third identification bit whether the electronic flash device FL is the zoom type or not and is set to 'H' in case of the zoom type.

It is noted that the flash distance includes a flash photography available distance range which ensures proper exposure in the TTL automatic light emission control mode and an effective objective distance inevitably determined in the manual illumination mode.

The above eight bits of data are transferred from the electronic flash device FL to the camera body CA in the second serial data transfer at step #16.

After the two serial data transfers carried out as described above, the camera computer 2 determines whether the FDC signal exists in the input 16 bits of data or not, i.e. whether the bit b4 is in the state of 'L' or not at step #18. If the bit b4 is determined to be in the state of 'L', this is displayed by the display device 4 described later.

At step #20, the camera computer 2 reads a set film speed value Sv from the film speed setting circuit 8 and at step #21, reads from the light measuring circuit 7 a brightness value Bv0 of the object to be photographed detected by a light receiving element (not shown) after a passage through the photographic lens LE. At step #22, an interval photography judgement subroutine, which judges whether the photography is controlled by the interval device IT to be carried out at intervals or not, is called.

Figure 4:
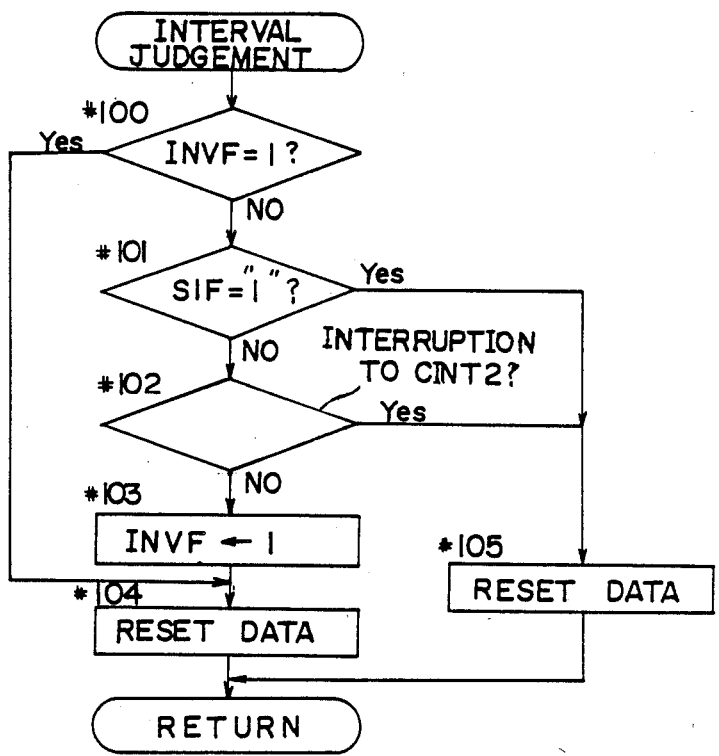

This interval photography judgement subroutine called at step #22 will be particularly described hereinafter with reference to a flow chart in FIG. 4.

At step #100, the camera computer 2 judges whether an interval flag INVF is set or not. This flag is set if this subroutine is called and the interval photography judgement is made. If it is judged at step #100 that this flag INVF is set to '1', the process jump step #104 without carrying out a judgement flow beginning #101.

On the other hand, if it is judged at step #100 that the flag INVF is set to '0', at steps #101 and #102, it is judged, by whether the S1 flag S1F is set or not and by whether an input terminal IP6 is in the state of 'H' or not, respectively. In other words, it is judged whether this interruption into the flow is the one made to the interruption input terminal CINT1 by the closure of the light measuring switch S1 or the one made to the interrupiton input terminal CINT2 b the flash display start signal FDSS which is transferred through the signal line 12 from the electronic flash device FL ( the latter condition will be referred to as FD mode). In case of these interruptions by the closure of the light measuring switch S1 and by the input of the flash display start signal FDSS, the data indicating the interval mode is reset at step #105 and then the process returns to the main routine. If the interruption is made for a different reason other than the above two cases, i.e. for an interval photography, the interval flag INVF is set to '1' at step #103 and the data indicating the interval mode is set at step #104 and then the process returns to the main routine.

Referring back to FIG. 3A, after the process returns from the interval photography judgement subroutine, the camera computer 2 judges at step #23 based on a condition of the bit b3 which data is input in the serial data transfer at step #15 whether charging to the main capacitor C2 of the electronic flash device FL is completed or not. If the charging is judged to have been completed, at step #24 a flash light calculation subroutine is called in order to calculate exposure control data for a flash photography. If not, at step #25 a daylight calculation subroutine is called in order to compute exposure control data for a daylight photography.

These two subroutines will be particularly described next. It is to be noted that in either subroutine the exposure calculation is made according to the APEX system.

Figure 5:
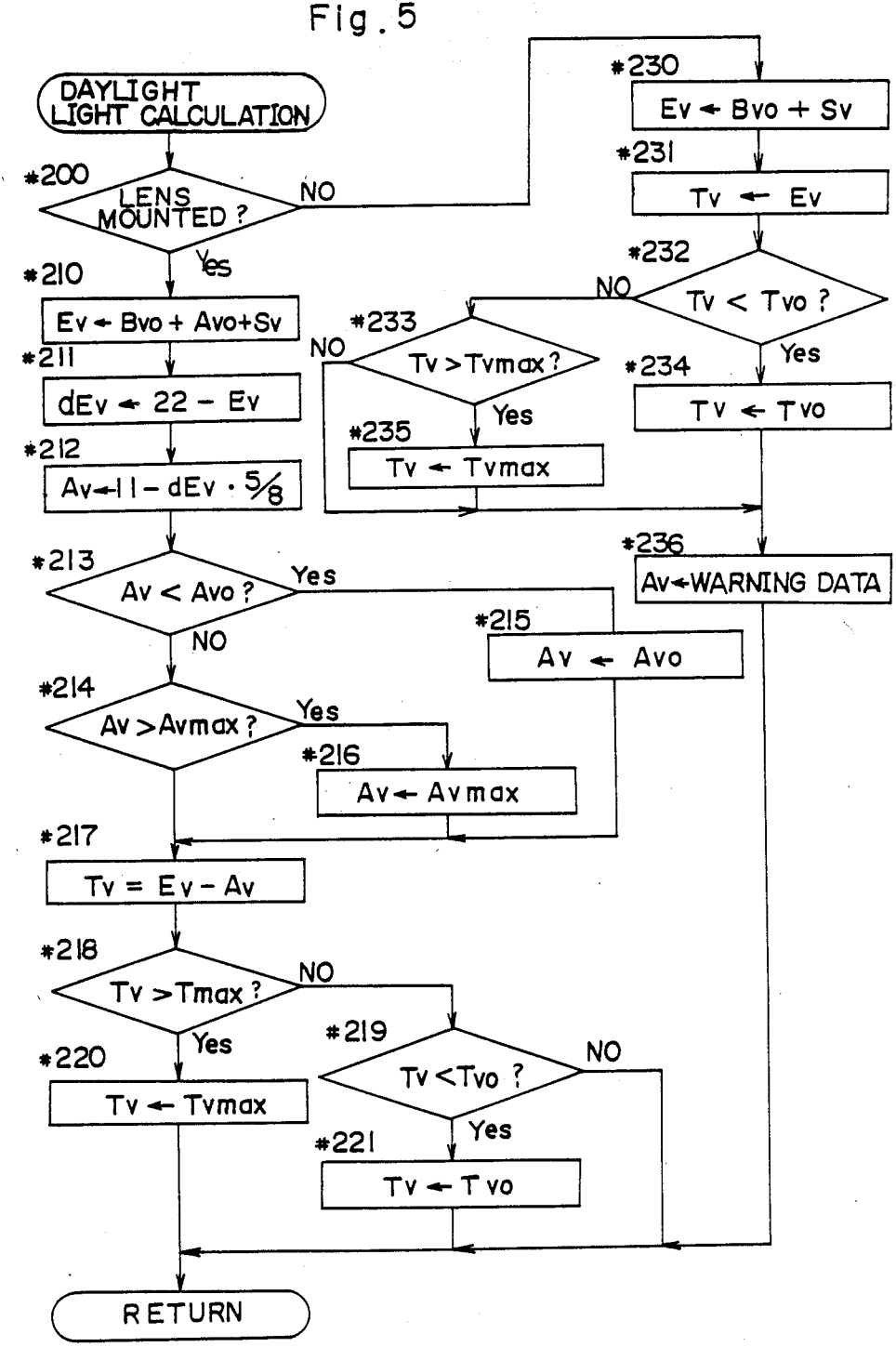

Firstly, the daylight calculation subroutine will be described with reference to a flow chart in FIG. 5.

When this subroutine is called, at step #200 it is judged based on the data input from the photographic lens LE at step #6 whether the photographic lens LE is mounted or not. If it is judged that the photographic lens LE is mounted, an exposure value Ev is obtained at step #210 by adding the full open diaphragm aperture value Av0 of the photographic lens LE input from the lens LE at step #6, the brightness value Bv0 of the object to be photographed obtained after the passage through the lens LE from the light measuring circuit 7 and further the film speed value Sv input at step #20 . At step #211, a difference dEv between the obtained exposure value Ev0 (Ev0=22; Av=11, Tv=11) and a reference exposure value is computed Then, a control diaphragm aperture value Av is derived from the following equation (1) at step #212.

$$Av = 11 - dEv \text{ } | \quad (1)$$

At steps #213 and #214, this control diaphragm aperture value Av is compared with the full diaphragm aperture value Av0 of the mounted photographic lens LE and with the diaphragm aperture value of the minimum diaphragm aperture Avmax, respectively. If the control diaphragm aperture value Av is smaller than the full diaphragm aperture value Av0, the control value Av is replaced by the full diaphragm aperture value Av0 at step #215. If the control diaphragm aperture value Av is greater than the diaphragm aperture value of the minimum diaphragm aperture Avmax, the control diaphragm aperture value Av is replaced by the value Avmax at step #216.

Thereafter, at step #217 a control exposure time value Tv is obtained by subtracting the control diaphragm aperture value Av from the exposure value Ev obtained at step #210. At steps #218 and #219, this control exposure time value Tv is compared with an exposure time value Tv0 of the longest shutter speed controllable in the camera body CA and with an exposure time value Tvmax of the shortest shutter speed of the same, respectively. If the control exposure time value Tv is greater than the exposure time value Tvmax of the shortest shutter speed, the control exposure time value Tv is replaced by the exposure time value Tvmax at step #220. If the control exposure time value Tv is smaller than the exposure time value Tv0 of the longest shutter speed, the control exposure time value Tv is replaced by the exposure time value Tv0 of the longest shutter speed at step #221 and then the process returns to the main routine.

On the other hand, if it is judged at step #200 that the photographic lens LE is not mounted, at step #230 the exposure value Ev is obtained by adding the film speed value Sv to the brightness value Bv0 and this exposure value Ev becomes the control exposure time value Tv at step #231.

At steps #232 and #233, this control exposure time value Tv is compared with the exposure time value Tv0 of the longest shutter speed and with the exposure time value Tvmax of the shortest shutter speed, respectively. If the control exposure time value Tv is greater than the exposure time value Tvmax of the shortest shutter speed or smaller than the exposure time value Tv0 of the longest shutter speed, the control exposure time value Tv is respectively replaced by the value Tvmax or by the value Tv0 at steps #234 and #235 and as the control diaphragm aperture value Av a warning data is set at step #236 and then the process returns to the main routine.

Figure 6:
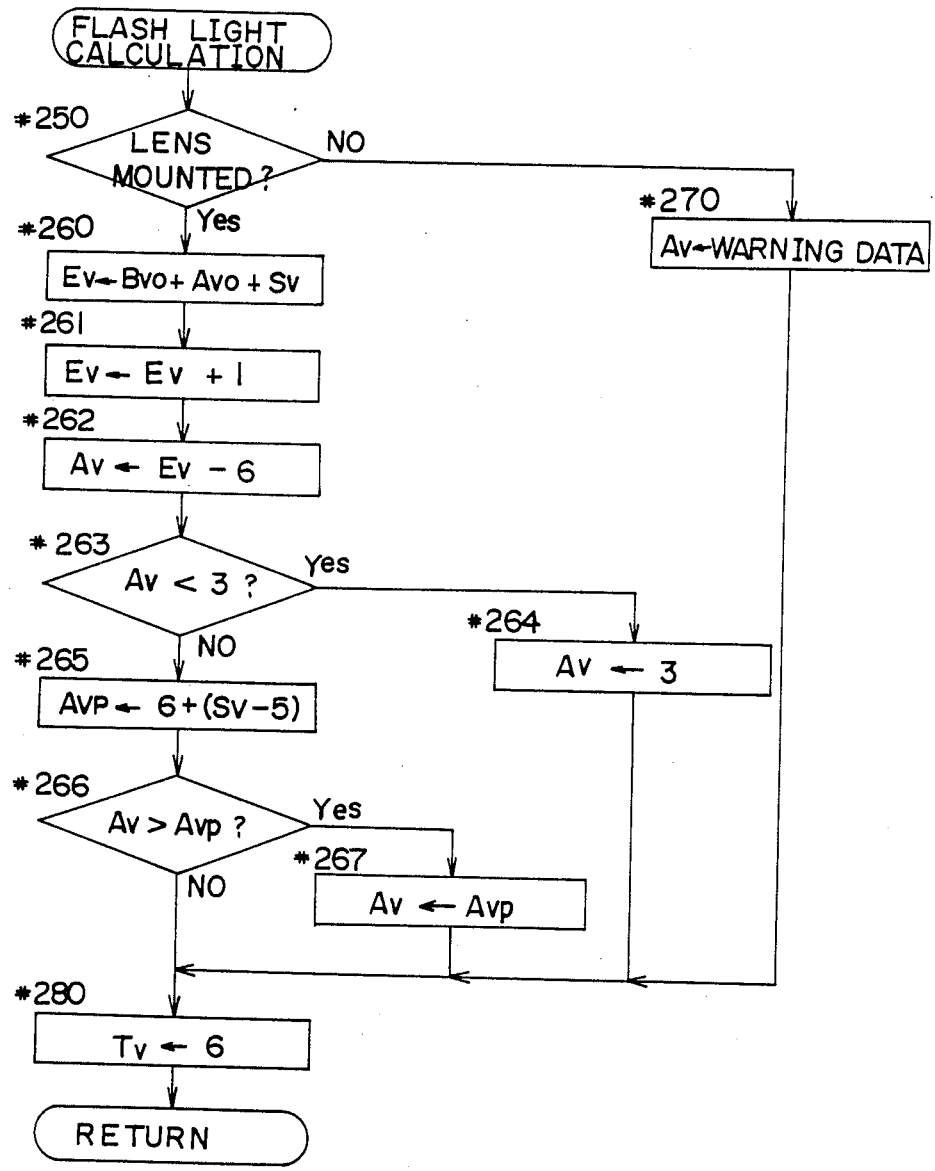

The flash light calculation subroutine called at step #24 will be particularly described next with reference to a flow chart in FIG. 6.

When this subroutine is called also, it is judged at step #250 whether the photographic lens LE is mounted or not. If it is judged that the lens LE is mounted, in the same manner as the daylight calculation subroutine, the exposure value Ev is obtained at step #260. At step #261, this exposure value Ev with 1 added thereto becomes a new exposure value Ev. At step #262, a control diaphragm aperture value Av is obtained by subtracting 6, which is a control exposure time value corresponding to a synchronizable shutter speed of 1/60 s fixed at a flash photography from the above new exposure value Ev.

At step #263, it is judged whether this control diaphragm aperture value Av is smaller than 3 (corresponds to 2.8 of the F number) or not. If the control diaphragm aperture value Av is smaller than 3, the control diaphragm aperture value Av becomes 3 at step #264 and the process jumps to step #280. If the control diaphragm aperture value Av is greater than 3, the process goes on to step #265 where a diaphragm aperture value Avp of the smallest possible diaphragm aperture is obtained based on the input film speed value Sv. To describe the relationship between the film speed and the F number of the diaphragm aperture value of the smallest possible diaphragm aperture obtained at step #265, the F number is 8 when the ISO speed is 100 and is 16 when the ISO speed is 400, for instance. At step #266, this diaphragm aperture value Avp of the smallest possible diaphragm aperture is compared with the control diaphragm aperture value Av. If the control diaphragm aperture value Av is greater than the diaphragm aperture value Avp, the control diaphragm aperture value Av is replaced by the value Avp at step #267 and the process proceeds to step #280.

On the other hand, if it is judged at step #250 that the photographic lens LE is not mounted. A warning data is set as the control diaphragm aperture value Av at step #270 and then the process jumps to step #280.

At step #280, the control exposure time value Tv is set to 6 which corresponds to a synchronizable shutter speed of 1/60s. Thereafter, the process returns to the main routine.

Referring back to FIG. 3A, after the control exposure time value Tv and the control diaphragm aperture value Av are obtained at the aforementioned daylight calculation subroutine and the flash light computing subroutine at steps #24 and #25, respectively, the camera computer 2, at step #26, judges whether the electronic flash device FL is attached or not from the bit b0 having the data input at step #15. If it is judged that the electronic flash device FL is attached as the bit b0 is in the state of 'H', based on the bit b1 having the data also input at step #15, the computer judges at step #27 whether this electronic flash device FL is capable of the serial data transfer with the camera body CA, i.e. the device FL is the data transfer type or not. If it is judged that the mounted electronic flash device FL is the data transfer type as the bit b1 is in the state of 'L', the process on to the flow for the serial data transfer beginning at step #28.

On the other hand, if it is judged at step #26 that the electronic flash device FL is not mounted, or if it is judged that the electronic flash device FL is mounted but it is judged at step #27 that this device is not the data transfer type, the process jumps to step #37.

At step #28, the camera computer 2 switches the output terminals FM2 and FM3 to 'H' thereby to enter into the CF mode for the serial data transfer from the camera body CA to the electronic flash device FL. At step #29, the output terminal FM1 is maintained at 'H' for the time period T2, whereby the camera mode signal CMS in the state of 'H' is output through the signal line 13 to the electronic flash device FL for the time period T2 thereby to indicate to the electronic flash device FL that the process is now in the CF mode.

At step #30, the control diaphragm aperture value Av is set at serial data transfer registers. At step #31, in the same manner as the serial data transfer carried out at step #6, a data transfer is carried out. At the following steps #32 though #35, after data indicating the exposure mode, the film speed value Sv, the focal length value fv and the interval mode are respectively coordinated with each other and set at the serial data transfer registers, serial data transfers are carried out.

When the above serial data transfers are completed, the camera computer 2 switches the output terminals FM2 and FM3 to 'L' at step #36 and indicate the end of the CF mode to the electronic flash device FL. Thereafter, the process goes on to step #37.

On the other hand, when the electronic flash device FL is not mounted or when the mounted electronic flash device is not the data transfer type, the process also goes on to step #37.

At step #37, the camera computer 2 judges based on the bit b5 having the data input at step #15 whether the electronic flash device FL is the camera display type or not. If it is judged that the mounted electronic flash device FL is the camera display type as the bit b5 is in the state of 'H', i.e. the device FL does not have LCD type display device and the flash photography information such as the guide number and the flash distance need be displayed by the display device 4 of the camera body CA, a flash distance calculation subroutine is called at step #38 for calculating the available flash distance range which permits a proper exposure under flash photography based on the data input from the electronic flash device FL at steps #15 and #16.

Figure 7:
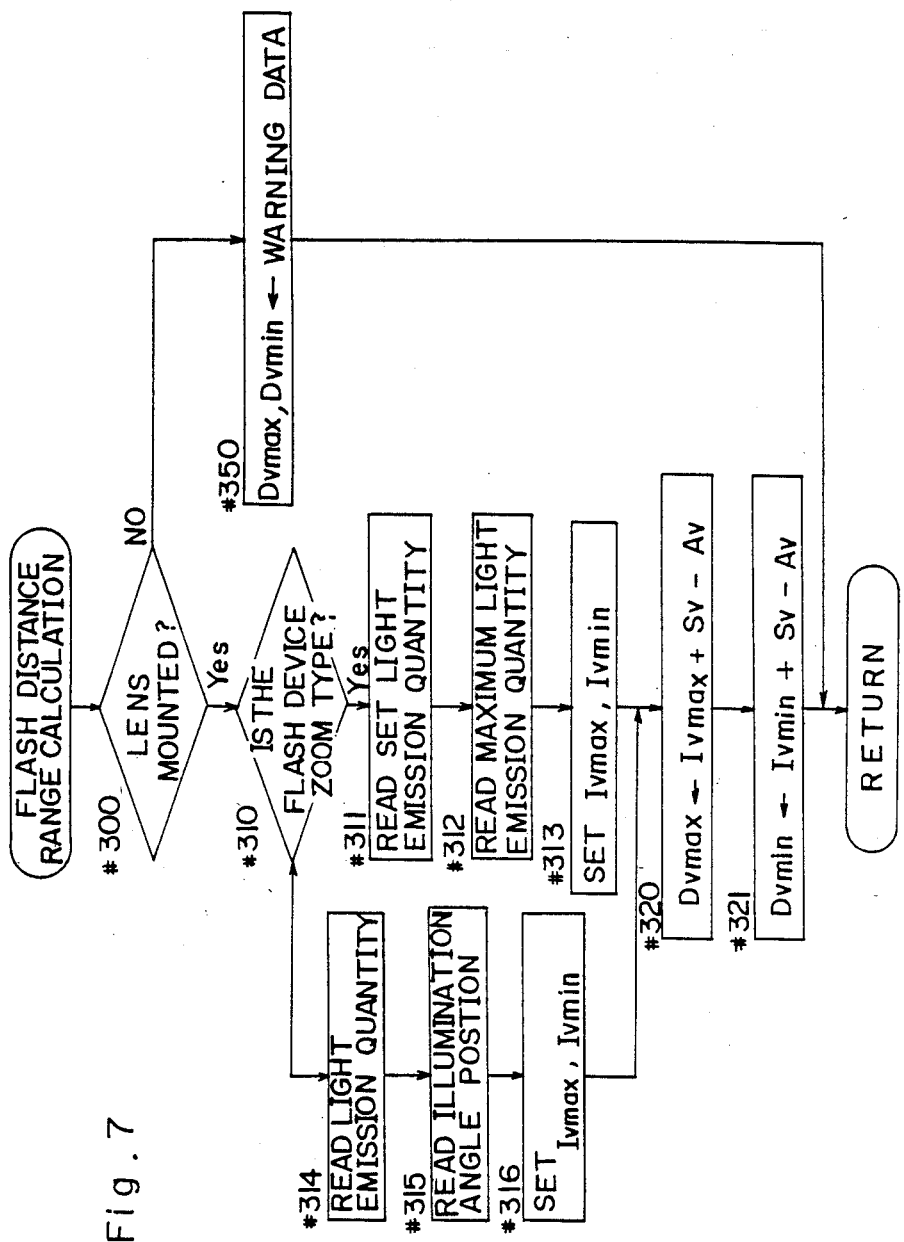

This flash distance calculation subroutine will be particularly described with reference to a flow chart in FIG. 7.

When this subroutine is called also, it is judged at step #300 whether the photographic lens LE is mounted or not. If it is judged that the photographic lens LE is mounted, the camera computer 2 judges at step #310 based on the state of the bit b15 having the data input at step #16 whether this electronic flash device is the zoom type or not. If it is judged that this electronic flash device FL is the zoom type as the bit b1 is in the state of 'H', at steps #311 and #312 based on the states of the bits b8, b9, b11, b12 having the data input at step #16 the data concerning the light emission quantity of the electronic flash device FL and the illumination angle are read.

At step #313, based on the above information and in the same calculation system as the APEX calculation system, the maximum light emission quantity value Ivmax at each illumination angle and the minimum light emission quantity value Ivmin at each illumination angle control are set. Table 2 shows the values thereof. It is to be noted that as for the illumination angle data the focal length values fv of the photographic lens LE are parameters.

TABLE 2

| fv | Ivmax | | | | | Ivmin |
|---|---|---|---|---|---|---|
| | full | ½ | ¼ | ⅛ | ... | |
| 28 mm | 2.5 | 1.5 | 0.5 | −0.5 | ... | −3.0 |
| 35 mm | 3.0 | 2.0 | 1.0 | 0.0 | ... | −2.5 |
| 50 mm | 3.5 | 2.5 | 1.5 | 0.5 | ... | −2.0 |
| 70 mm | 4.0 | 3.0 | 2.0 | 1.0 | ... | −1.5 |

More specifically, the light emission quantity values Ivmax and Ivmin are set to increase by 1 when the guide number GN is multiplied by $\sqrt{2}$ (the light emission quantity is multiplied by 2) and to increase by 0.5 when the guide number GN is multiplied by $\sqrt[4]{2}$ (the light emission quantity is multiplied by $\sqrt{2}$). That is to say, as the illumination angle varies by one step, the light emission quantity values Ivmax and Ivmin vary by 0.5 and as the set light emission quantity varies by one step, the maximum light emission quantity value Ivmax varies by 1. For instance, when the illumination angle data meets a focal length fv of 28 mm and the set light emission quantity is in the maximum, the maximum light emission quantity value Ivmax is 2.5, which is represented by a guide number of 13 corresponding to an ISO film speed of 100.

On the other hand, if it is judged at step #310 that the electronic flash device FL is not the zoom type, at steps #314 and #315 the set light emission quantity and the maximum light emission quantity of this electronic flash device FL are read based on the states of the bits b11 and b12 having the data input at step #16. At step #316, these values are coordinated with each other and actual maximum light emission quantity value Ivmax and minimum light emission quantity value Ivmin actually to be emitted are set. Table 3 shows the minimum light emission quantity values Ivmin of a non-zoom type electronic flash device

TABLE 3

| Iv | Ivmin |
|---|---|
| 3.0 | −2.5 |
| 4.5 | −1.0 |

After setting the maximum and minimum light emission quantity values Ivmax and Ivmin at steps #313 and #316, the process goes on to step #320. At this step #320, the film speed value Sv is added to the set maximum light emission quantity value Ivmax and then the control diaphragm aperture value Av is subtracted therefrom, whereby a maximum flash distance value Dvmax is obtained in the APEX calculation system. Thereafter, at step #321, in the same manner as above, a minimum flash distance value Dvmins is obtained From these obtained flash distance values Dvmax and Dvmin, flash distance range information for a flash photography by the electronic flash device FL is obtained. Then, the process returns to the main routine.

On the other hand, if it is judged at step #300 that the photographic lens LE is not mounted, the above flash distance range values Dvmax and Dvmin are combined with warning data (e.g. data for a bar display or an intermittent display) at step #350 and then the process returns to the main routine.

Referring back to FIG. 3B, when the flash distance computation by the flash distance calculation subroutine is completed or when it is judged at step #37 that the mounted electronic flash device is not the camera display type, the process goes on to step #39. At this step #39, it is judged whether this interruption to this flow is made from the interruption input terminal CINT2 or not. If so, it means that this flow is being carried out as the flash display start signal FDSS is output to permit the display device 4 of the camera body CA to display the flash photography information. In this case, a display 1 subroutine is called at step #40.

Figure 8:
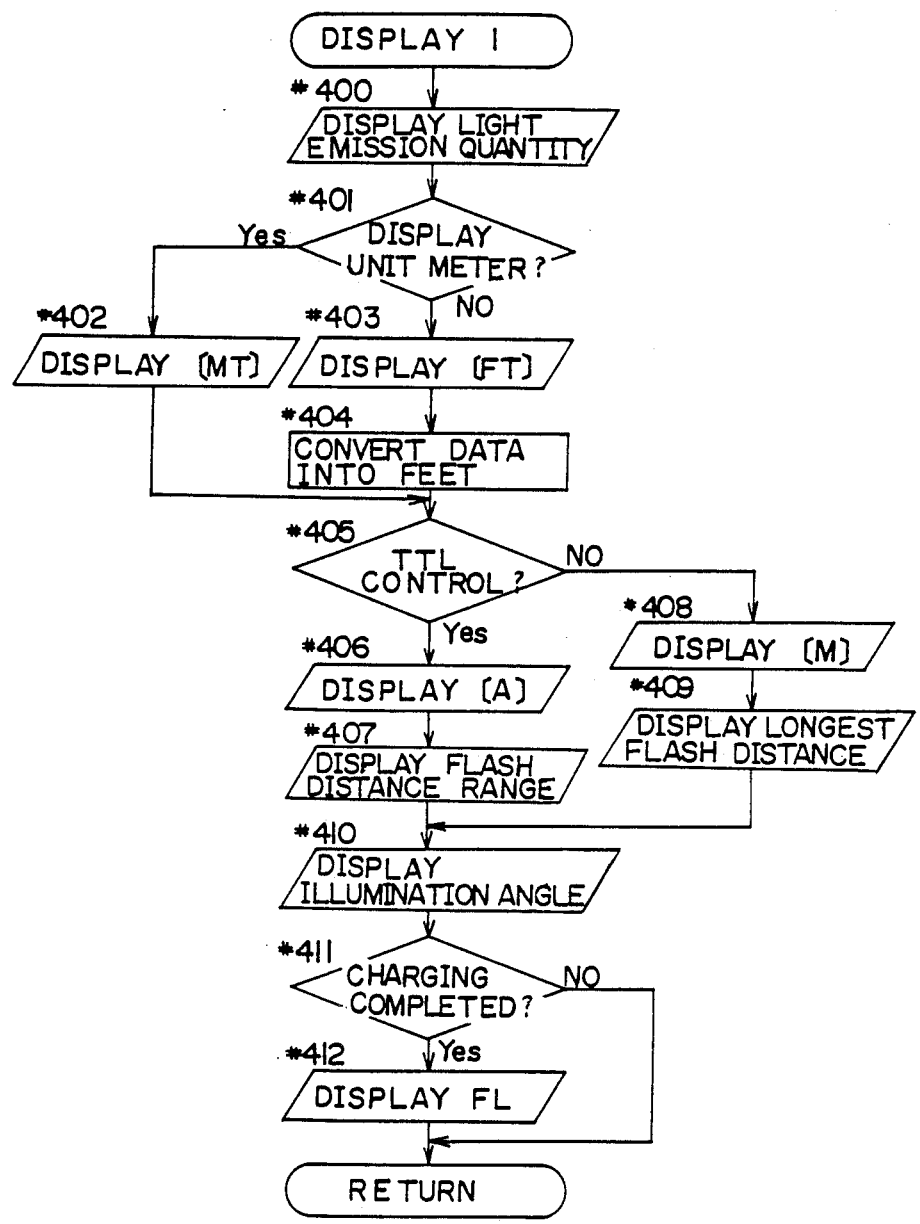

This display 1 subroutine will be particularly described with reference to a flow chart in FIG. 8.

When this subroutine is called, at step #400 a light emission quantity (one of full light emission, ½ light emission, ¼ light emission, ⅛ light emission) is displayed based on the data input at step #16. At step #401, it is judged based on the state of the bit b14 having the data input at step #16 whether the display of the flash distance is to be made by the meter or not. If it is judged that the display is to be made by the meter as the bit b14 is in the state of 'H', a character 'MT' is displayed at step #402. On the other hand, if it is judged that the display is to be made by the feet as the bit b14 is in the state of 'L', a character 'FT' is displayed at step #403 and at step #404 the flash distance values Dvmax and Dvmin obtained by the flash distance calculation subroutine are converted into the feet unit.

At step #405, a light emission mode is judged based on the state of the bit b13 having the data input at step #16. If it is judged that the mode is in the TTL auto light emission control mode as the bit b13 is in the state of 'H', a character 'A' is displayed at step #406 and then the two flash distance values Dvmax and Dvmin are displayed at step #407 and then the process jumps to step #410. On the other hand, if it is judged that the mode is in the manual illumination mode as the bit b13 is the state of 'L', a character 'M' is displayed at step #408 and the maximum flash distance value Dvmax alone is displayed at step #409 and then the process goes on to step #410.

At this step #410, a display of the illumination angle is made by using the focal length value fv. At step #411, it is judged whether the charging of the electronic flash device FL is completed or not. If it is judged that the charging is not completed, the process returns to the main routine. Whereas, if it is judged that the charging is completed, a character FL is displayed at step #412 and then the process returns to the main routine.

Referring back to FIG. 3B, if it is judged at step #39 that the interruption is not made to the interruption input terminal CINT2, the process goes on to step #41 where it is judged whether the charging of the electronic flash device FL is completed or not. If it is judged that the charging is completed, i.e. when a non camera-display-type electronic flash device FL is mounted or when the mounted electronic flash device is the camera display type but the flash display start signal FDSS is not output, a display 2 subroutine is called at step #42. On the other hand, if it is judged that the charging is not completed, i.e. the charging is not completed for a flash photography or a daylight photography is to be carried out, a display 3 subroutine is called at step #43.

The above two subroutines will be described next.

Figure 9:
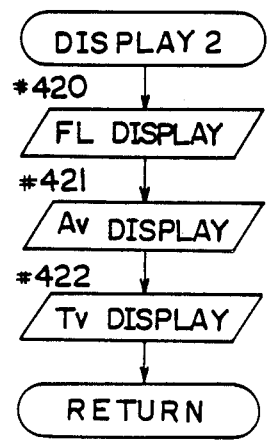

When the display 2 subroutine shown in FIG. 9 is called, the character FL is displayed to show the flash photograph mode step #420. At steps #421 and #422, a character 'F' with the control diaphragm aperture value Av and a character 'Tv' with the control exposure time value Tv are displayed. Then, the process returns to the main routine.

Figure 10:
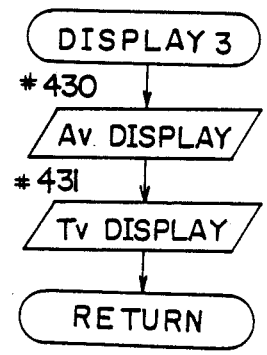

When the display 3 subroutine shown in FIG. 10 is called, the character 'F' with the control diaphragm aperture value Av and the character 'Tv' with the control exposure time value Tv are displayed at steps #430 and #431. Then the process returns to the main routine.

Figure 11:
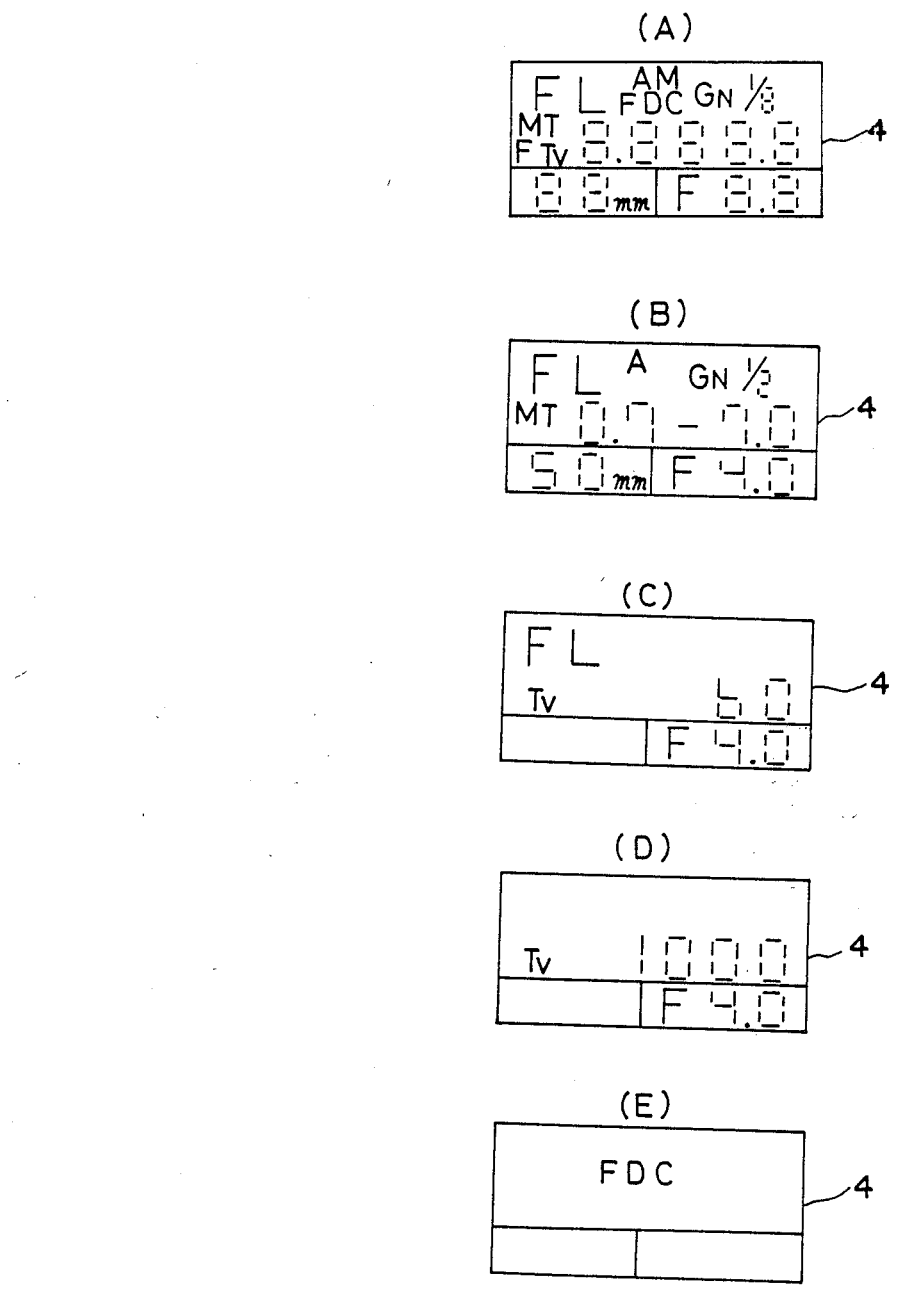

The displays by the respective display subroutines will be described with reference to FIGS. 11(A) through 11(E). FIG. 11(A) shows an illustration of all segments to be displayed by the LCD.

FIG. 11(B) shows one example of the display contents by the display 1 subroutine when the mounted electronic flash device FL is the camera display type. The character 'FL' indicates the flash photography mode. The character 'A' indicates the TTL automatic light emission control mode. A reference mark GN½ indicates that the set light emission quantity is ½. A reference mark MT 0.7–7.0 indicates that the available flash distance range in the TTL mode is between 0.7 m and 7.0 m. Further, a reference mark 50 mm indicates that the illumination angle corresponds to a focal length fv of 50 mm. And in case of the manual illumination mode, a character 'M' instead of 'A' is displayed. If the flash distance range is displayed in the feet, a character 'FT' instead of 'MT' is displayed.

FIG. 11(C) shows the display contents by the display 2 subroutine. The character 'FL' indicates the flash photography mode. Reference marks Tv60 and F 4.0 respectively indicate the control exposure time and the control diaphragm aperture.

FIG. 11(D) shows the display contents by the display 3 subroutine for the daylight photography. Reference marks Tv1000 and F4.0 respectively indicate the control exposure time and the control diaphragm aperture.

A character FDC in FIG. 11(E) is displayed in addition to the contents shown in FIGS. 11(B) and 11(C) at the attainment of a proper flash light control.

Referring back to FIG. 3B, when any one of the three display subroutines is called at steps #40, #42, #43 and the process returns to the main routine, the process always goes on to step #44. At this step #44, the camera computer 2 checks the input terminal IP3 and judges whether the release switch S2 is closed or not , or judges whether the release signal RSS is output from the interval device IT or not. If it is judged that the release switch S2 is not closed and the release signal RSS is not output as the input terminal IP3 is in the state of 'H', the process jumps to step #59. On the other hand, if it is judged that the release switch S2 is closed or the release signal RSS is output as the input terminal IP3 is in the state of 'L', a signal for stopping the autofocus adjustment operation is output at step #45.

At step #46, the output terminal FM2 is switched to 'H' and at step #47 the output terminal FM1 is maintained at 'H' for the time period T3, whereby the camera mode signal CMS in the state of 'H' is output through the signal line 3 to the electronic flash device FL for the time period T3 and it is indicated to the electronic flash device FL that the camera operation mode is now in the EC mode for controlling the actual exposure. At step #48, the camera computer 2 switches the output terminal FM2 to 'L' and stops the indication of the camera mode to the electronic flash device FL.

At step #49, the interval flag INVF is reset. At step #50, the output terminal OP4 is switched to 'H' such that the camera computer 2 receives a charging completion signal CES transferred from the electronic flash device FL and starts the TTL automatic light emission control operation. At step #51, an analog voltage value Vsv corresponding to the film speed value Sv is output to the automatic light emission control circuit 10 and then the exposure control is carried out based on the computed control diaphragm aperture value Av and the control exposure time value Tv at step #52.

Thereafter, the input terminal IP4 is checked to judge the state of the exposure completion switch S3. If it is judged that the exposure is completed as the input terminal IP4 is in the state of 'L', the output terminal OP4 is switched to 'L' at step #54. At step #55, the output terminal OP1 is maintained at 'H' for a time period T4, whereby an exposure completion signal EES in the state of 'L' is output through the signal line 12 to the interval device IT for the time period T4 and the completion of the exposure is indicated to the interval device IT.

Thereafter, a control signal for driving the film winding motor M1 to wind up the film is output to the motor control circuit 5. Then, at step #57 the input terminal IP5 is checked to judge the state of the switch S4 which is closed with a completion of one-frame film winding-up operation. If it is judged that the film winding operation is completed as the input terminal IP5 is in the state of 'L', the control signal for stopping the film winding motor M1 is output to the motor drive circuit 5 at step #58 and then the process goes on to step #59.

At this step #59, the input terminal IP1 is checked to judge the state of the light measuring switch S1. If it is judged that the light measuring switch S1 is closed as the input terminal IP1 is in the state of 'L', a timer TC is reset at step #62 to successively carry out a light measuring operation and the displays of the respective photographic information and the timer is restarted at step #63 and then the process goes on to step #64.

On the other hand, if it is judged at step #59 that the light measuring switch S1 is opened, a focal length value fvL of the photographic lens LE which is stored in the register FR and is obtained in the previous execution of this flow and a present focal length value fvP of the photographic lens LE are compared with each other at step #60. If these focal length values fvL and fvP are different from each other, i.e. the focal length value fv has changed owing to a zooming operation to the photographic lens LE, the present focal length value fvP is stored in the register FR and the timer TC is reset at step #62 and is restarted at step #63, and then the process goes on to step #64.

If it is judged at step #60 that the present focal length value fvP and the previous focal length value fvL are the same each other, the process jumps to step #64 without carrying out any operations. It is to be noted that at the moment of power supply the register FR stores data corresponding to a focal length fv of 28 mm of the photographic lens LE.

At step #64, it is judged whether 10 seconds have passed since the timer TC starts counting or not. If it is judged that the 10 seconds have not yet passed, the process returns to step #4 and repeats the above flow. If it is judged that the 10 seconds have passed, the photometric operation is stopped at step #65 and the displays are turned off or deenergized at step #66. And, then the output terminal OP2 is switched to 'L', whereby the power supply transistor Tr1 is turned 'OFF' to stop the power supply to the respective components of the camera body CA. Thereafter, an interruption to this flow is enabled at step #68 and the camera computer 2 is stopped.

That is to say, for saving or lowering power consumption of the battery BA2 which is the power source of the camera body CA, if the light measuring switch S1 is not closed when the light measurement and the display are carried out or when the one-frame photographic operation by the closure of the switch S1 is completed, the light measuring operation and the display operation are stopped after the time lapse of 10 seconds and at the same time the power supply to the components except the camera computer 2 , the interface circuit 3 and the like is stopped. Further, this will be more particularly described later, by stopping the camera computer 2 thereby to stop the output of the camera mode signal CMS which acts as a start signal for the electronic flash device FL, the operation of the electronic flash device FL is also inhibited ( the above 10 seconds will be referred to as camera power supply hold time).

If it is judged that the focal length value of the photographic lens LE has changed, e.g. that the zooming operation of the zoom lens has been carried out, it is likely that a photographic operation will be soon carried out. Therefore, the timer TC for measuring the camera power supply hold time is reset and restarted, whereby the light measuring operation, the display operation, or a change operation of the illumination angle of the electronic flash device FL, which will be described later, may be continuously carried out, thus a speedy photographic operation is possible. The above judgements and operations are carried out by the flow extending from step #59 to step #67.

Figure 12:
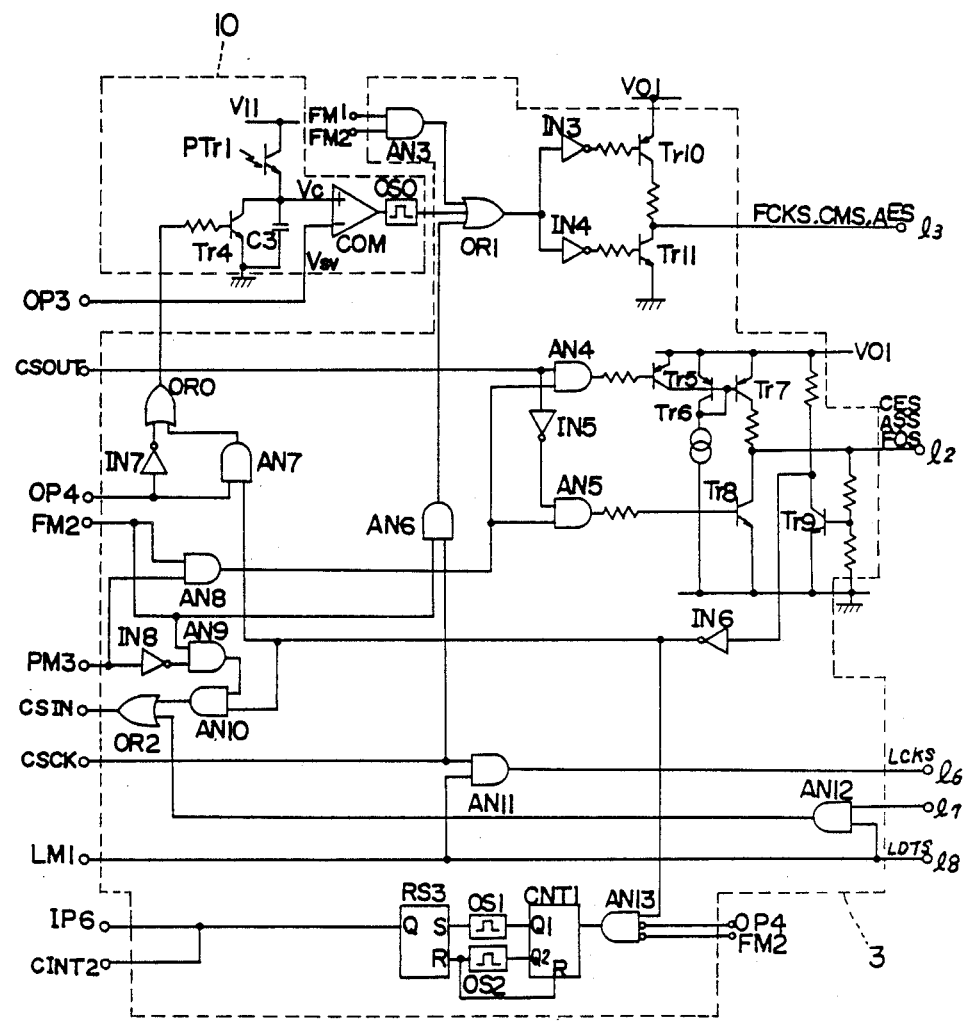
FIG. 12 is a circuit diagram showing construction and function of an automatic light emission control circuit and interface circuit for use in the first preferred embodiment of the present invention.

Constructions and functions of the automatic light emission control circuit 10 and the interface circuit 3 will be particularly described next with reference to a circuit diagram shown in FIG. 12.

Firstly, operations for serial data transfers between the camera body CA and the photographic lens LE will be described.

For the serial data transfer with the photographic lens LE, as described hereinbefore, the 'H' signal is output from the output terminal LM1 of the camera computer 2. This signal, acting as a lens data transfer start signal LDTS, is input through the signal line 18 to a chip select terminal CS of the lens circuit 11. The 'H' signal from the output terminal LM1 is also input to the AND gates AN11 and AN12 to unblock these AND gates AN11 and AN12 during the serial data transfers with the photographic lens LE.

Thereafter, a clock signal is output from the output terminal CSCK of the camera computer 2. This clock signal CSCK is transferred through the unblocked AND gate AN11 and the signal line 18 to the photographic lens LE as a lens data transfer clock signal LCKS. This clock signal LCKS is input to an clock signal input terminal LSCK of the lens circuit 11 and synchronously with a rise thereof, the data stored in the lens circuit 11 are transferred through the signal line 17 to the camera body CA and then through the AND gate AN12 and an OR gate OR2 to be input to a serial data input terminal CSIN of the camera computer 2. When the serial data transfer is completed, the output terminal LM1 of the camera computer 2 outputs an 'L' signal and the AND gates AN11 and AN12 are blocked Next, operations for serial data transfers between the camera body CA and the electronic flash device FL will be particularly described.

For the serial data transfers with the electronic flash device FL, as described hereinbefore, the output terminal FM2 of the camera computer 2 outputs an 'H' signal to unblock the AND gates AN3, AN6, AN8, AN9. Thereafter, the output terminal FM1 outputs an 'H' signal for a time period T1 or T2 or T3 corresponding to the present camera operation mode. This signal goes through the AND gate AN3 and then through an OR gate OR1 to be output therefrom. This output signal is inverted to 'L' through an inverter IN3 thereby to turn 'ON' the transistor Tr10, whereby the 'H' signal as the camera mode signal CMS is transferred through the signal line 13 to the electronic flash device FL. On the other hand, if the output signal from the OR gate OR1 is in the state of 'L', this signal is inverted to 'H' through an inverter IN4 to turn 'ON' a transistor Tr11, whereby an 'L' signal is transferred through the signal line 13 to the electronic flash device FL.

Thereafter, the output terminal CSCK of the camera computer 2 outputs a clock signal. This clock signal goes through the AND gate AN6, OR gate OR1, the two inverters IN3 and IN4 and then through transistors Tr10 and Tr11, and is transferred as the flash data transfer clock signal FCKS through the signal line 13 to the electronic flash device FL. Synchronously with a rise and a fall of this clock signal FCKS, the data are exchanged.

Firstly, the FC mode for transferring data from the electronic flash device FL to the camera body CA will be described.

In this mode, the output terminal FM3 of the camera computer 2 is in the state of 'L' and the output signal from the AND gate AN8 is in the state of 'L', whereby AND gates AN4 and AN5 receiving this output signal are blocked to output 'L' signals and the transistor Tr5 is turned 'ON' whereby the transistors Tr6 and Tr8 are turned 'OFF' Therefore, the interface circuit 3 is ready to receive inputs from the electronic flash device FL. On the other hand, the 'L' signal from the output terminal FM3 is inverted to 'H' through an inverter IN8 whereby the output signal from the AND gate AN 9 is switched to 'H' to unblock an AND gate.

If a data signal serially transferred through the signal line 12 from the electronic flash device FL is input in this state, this signal is inverted through the transistor Tr9 and is again inverted through an inverter IN6 to regain its original state and then is input to the AND gate AN10. This signal goes through the unblocked AND gate AN10, the OR gate OR2 and then is input to a serial data input terminal CSIN of the camera computer 2.

The CF mode for transferring data from the camera body CA to the electronic flash device FL will be described next.

In this mode, the camera computer 2 outputs an 'H' signal from its output terminal FM3 and the output signal from the AND gate AN8 is in the state of 'H', whereby the AND gates AN4 and AN5 are unblocked.

On the other hand, the 'H' signal from the output terminal FM3 is inverted to 'L' through the inverter IN8, whereby the output signal from the AND gate AN9 is switched to block the AND gate AN10. Thus, the serial data input terminal CSIN of the camera computer 2 does not receive the data signal And, the unblocked AND gate AN4 receives a data signal from a serial data output terminal CSOUT of the camera computer 2 and in the same way the unblocked AND gate AN5 receives the data signal inverted through the inverter IN5.

In case of a serial data transfer from the camera body CA, a data signal is output from the serial data output terminal CSOUT of the camera computer 2.

If the signal output from the serial data output terminal CSOUT is in the state of 'H', the signal output from the AND gate AN4 is switched to 'H' and the transistor Tr5 is turned 'OFF', whereby the two transistors Tr6 and Tr7 are turned 'ON'. On the other hand, the output signal from the AND gate AN5 is switched to 'L' and the transistor Tr8 is turned 'OFF', whereby an 'H' signal is transferred through the signal line 12 to the electronic flash device FL.

If the output signal from the serial data output terminal CSOUT is in the state of 'L', the output signal from the AND gate AN4 is switched to 'L' and the transistor Tr5 is turned 'ON', whereby the two transistors Tr6 and Tr7 are both turned 'OFF . On the other hand, the output signal from the AND gate AN5 is switched to 'H' and the transistor Tr8 is turned 'ON', thus an 'L' signal is transferred through the signal line 2 to the electronic flash device FL.

The FD mode for displaying on the camera body CA the flash photography information from the electronic flash device FL will be hereinafter described.

When the camera CA is not in the exposure control operation or in the serial data transfer operation, the output signals from the output terminals OP4 and FM2 are in the state of 'L' to unblock an AND gate AN13. In this condition, when the flash display start signal FDSS including two pulses is transferred through the signal line 12 from the electronic flash device FL in order to permit the display device 4 of the camera body CA to display the flash photography information, the AND gate AN13 outputs this signal FDSS as it is to the counter circuit CNT1. The counter circuit CNT1, receiving these two pulses, switches an output terminal Q1 to 'H'. Thereafter, as the electronic flash device FL transfers the flash display stop signal FDES including two pulses, the counter circuit CNT1, switches an output terminal Q2 to 'H'.

This 'H' signal from the output terminal Q1 of the counter circuit CNT1 sets an RS-flip-flop RS3 through a one-shot pulse generating circuit OS1 and 'H' signals are input to the input terminal IP6 and the interruption input terminal CINT2 of the camera computer 2, whereby the FD mode for permitting the display device 4 of the camera body CA to display the flash photography information of the electronic flash device FL is started. Further, the 'H' output signal from the output terminal Q2 of the counter circuit CNT1 resets the RS-flip-flop circuit RS3 through the one-shot pulse generating circuit OS2 and 'L' signals are input to the input terminal IP6 and the interruption input terminal CINT2, whereby the FD mode is terminated.

The output signal from the output terminal Q2 of the one-shot pulse generating circuit OS2 is input to a reset terminal R of the counter circuit CNT 1 and when the FD mode is terminated as described above, the counter circuit CNT1 is reset thereby to switch the two output terminals Q1 and Q2 to 'L'.

Light emission control operation by the EC mode for the exposure control in the flash photography using the electronic flash device FL, will be particularly described next.

When a transfer of the camera mode signal CMS indicating the EC mode is completed, the output signal from the output terminal OP4 of the camera computer 2 is switched to 'H' thereby to unblock an AND gate AN7. In this condition, if the charging of the main capacitor C2 of the electronic flash device FL is completed, the electronic flash device FL transfers an 'H' charging completion signal CES through the signal line 2. This signal is twice inverted through the transistor Tr9 and the inverter IN8 and then input to the AND gate AN7. Thus, the output signal from the AND gate AN7 is switched to 'H' and the transistor Tr4 is turned 'ON', whereby a capacitor C3 for light emission control is discharged.

It is to be noted that when the output signal from the output terminal OP4 is in the state of 'L', also this signal is inverted to 'H' through an inverter IN7 whereby the transistor Tr4 is turned 'ON' and the capacitor C3 is discharged.

In this EC mode, as will be more particularly described later, if an X contact SX is closed and a flash synchronous signal XTS is transferred through the signal line 1 to the electronic flash device FL, the device FL transfers an 'L' light emission control start signal ASS through the signal line 2. This signal ASS is twice inverted through a transistor Tr9 and an inverter IN6 and is then input to the AND gate AN7, whereby the output signal from the AND gate AN7 is switched to 'L'. In this condition, the output signal from the output terminal OP4 of the camera computer 2 is in the state of 'H' in order to indicate the EC mode as described before and the output signal from the inverter IN7 is in the state of 'L'. Therefore, an output signal from an OR gate OR0 is switched to 'L' and the transistor Tr4 is turned 'OFF', whereby the light emission control operation by the automatic light emission control circuit 10 is started.

The light emitted from the electronic flash device FL and reflected from the object to be photographed is input to a photo transistor PTr1 and then photoelectric current amplified therein and output therefrom is charged in the light emission control capacitor C3. A comparator COM receives at each input terminal output voltage Vc from the light emisson control capacitor C3 and analog voltage Vsv corresponding to the film speed value Sv from the output terminal OP3 of the camera computer 2. When the output voltage Vc from the light emission control capacitor C3 reaches a reference analog voltage Vsv, the output signal from the comparator COM is switched from 'L' to 'H'.

This output signal is converted into pulses through a one-shot pulse generating circuit OS0 and then transferred as aforementioned light emission control signal AES through the OR gate OR1, inverters IN3 and IN4, transistors Tr10 and Tr11 and through the signal line 12 to the electronic flash device FL, in the same manner as the aforementioned serial data transfer from the camera body CA to the electronic flash device FL.

The construction and functions of the electronic flash device FL will be particularly described next.

The construction of the electronic flash device FL is hereinbefore described schematically with reference to FIG. 2B. At this time, the constructions and functions of the group of switches 23 and the control section 14 will be particularly described with reference to the circuit diagram shown in FIG. 1.

Each of the switches S6 through S10 comprises a push switch which is normally open. A reference mark S6 stands for an illumination mode change switch for switching between the TTL automatic light emission control mode and the manual illumination mode, S7 for a display unit change switch for switching between the meter unit display and the feet unit display, S8 for a light emission quantity change switch, S9 for an illumination angle change switch, S10 for a display switch for permitting the display device 4 of the camera body CA to display the flash photography information from the electronic flash device FL. It is to be noted that when the photographic data have changed the display device 4 of the main camera body CA displays the changed photographic data by depressing other switches S6 through S9 instead of the display switch S10 also.

Signals from the respective switches S6 through S10 are input through the switch control circuit 24 to the flash computer 12. In this switch control circuit 24 the signals from the switches S6 through S9 are respectively input as they are to the input terminals IP11 through IP14 of the flash computer 12. The signals from the respective switches S6 through S10 are input to an AND gate AN22. The output signal from this AND gate AN22 is input to an interruption input terminal FINT2 and an input terminal IP15 of the flash computer 12.

If any one of the switches S6 through S10 is closed, an 'L' is signal output from the AND gate AN22 to the interruption input circuit FINT2 of the flash computer 12, whereby an execution of an interruption flow of the flash computer 12, which will be particularly described later, is started.

Functions of the control section 14 will be described next.

Firstly, functions of the same in transferring data between the camera body CA and the electronic flash device FL will be described.

The signal input to the signal line 1 is normally in the state of 'H' and when the X contact SX is closed 'L' synchronous signal XTS is transferred. Thus, the transistor Tr12 is turned 'OFF' and its output signal is in the state of 'L'. This signal is inverted to 'H' through an inverter IN9, thus an AND gate AN14 receiving this signal is unblocked. In this condition, if the camera mode signal CMS is input from the camera body CA through the signal line 13 to the electronic flash device FL, this signal CMS is inverted through the transistor Tr20 and then again inverted through an inverter IN10 to regain its original state and then input through the AND gate AN14 to a mode identification circuit 19.

The mode indentification circuit 19, which is receiving also a clock signal $\phi 2$ output from an output termianl FCLK of the flash computer 12, judges the time period of the 'H' state of the above signal input from the AND gate AN14 by using this clock signal $\phi 2$. If it is judged that the present mode is the FC mode as the time period is T1, an 'H' signal is output from an output terminal FC. If the time period is judged to be T2 and the present mode is judged to be the CF mode, an 'H' signal is output from an output terminal CF. Further, if the time period is judged to be T3 and the present mode is the EC mode, an 'H' signal is output from an output terminal EC.

Among the aforementioned modes, in the FC mode and the CF mode, when the serial data transfer is completed, an 'H' pulse signal is output from an output terminal SIORE of the flash computer 12. This pulse signal goes through an OR gate OR4 and then is input to a reset terminal RE of the mode identification circuit 19, whereby the mode identification circuit 19 is reset and the respective output terminals FC and CF are switched to 'L'.

In the EC mode, when the travel of the trailing or rear shutter curtain is completed in the camera body CA, the X contact XS is opened, whereby the transistor Tr12 is turned 'OFF', the output signal from this transistor Tr12 is converted into pulses through a one-shot pulse generating circuit OS6, the signal is then input through the OR gate OR4 to the reset terminal RE of the mode identification circuit 19 in the same manner as above thereby to reset this circuit 19 and then the output terminal EC is switched to 'L'.

Functions of the respective modes will be described next.

Firstly, the FC mode will be described.

As described hereinbefore, in this mode, the 'H' signal is output from the output terminal FC of the mode identification circuit 19. This signal is converted into pulse through a one-shot pulse generating circuit OS3 and then input to the interruption input terminal FINT1 of the flash computer 12, whereby the interruption flow of the flash computer 12 to be more particularly described later is started.

Also, the 'H' signal from the output terminal FC of the mode identification circuit 19 is input through an OR gate OR3 to an AND gate AN15 to unblock this AND gate AN15. In this condition, if the flash data transfer clock signal FCKS transferred through the signal line 3 from the camera body CA is input to this AND gate AN15, this clock signal FCKS is input as it is to the clock signal input terminal FSCK of the flash computer 12.

The 'H' signal output from the OR gate OR3 is inverted to 'L' through a NOR gate NOR1 and then input to an AND gate AN16. Thus, the AND gate AN16 outputs an 'L' signal and an OR gate OR5 receiving this signal outputs to the AND gates AN17 and AN18 the data signal output from the serial data output terminal FSOUT of the flash computer 12 synchronously with a rise of the flash data transfer clock signal FCKS. These AND gates AN17 and AN18 receive another signal which is the signal from the output terminal CF of the mode identification circuit 19 inverted through an interter IN11. This signal is in the state of 'H' in the FC mode, thus the AND gates AN17 and AN18 are unblocked.

For a serial data transfer from the electronic flash device FL, a data signal from the serial data output terminal FSOUT of the flash computer 12 is output through the OR gate OR5 in this condition.

If the output signal from the OR gate OR5 is in the state of 'H', the AND gate AN17 outputs an 'H' signal and the AND gate AN18 outputs an 'L' signal since the input signal from the OR gate OR5 is inverted. Thus, the transistor Tr13 is turned 'OFF', the transistors Tr14 and Tr15 are turned 'ON' and the transistor Tr16 is turned 'OFF', whereby an 'H' signal is transferred through the signal line 12 to the camera body CA.

On the other hand, if the output signal from the OR gate OR5 is in the state of 'L', the AND gate AN17 outputs an 'L' signal and the AND gate AN18 outputs an 'H' signal, thus the transistor Tr13 is turned 'ON', the transistors Tr14 and Tr15 are turned 'OFF' and the transistor Tr16 is turned 'ON', whereby an 'L' signal is transferred trough the signal line 2 to the camera body CA.

The CF mode will be described next.

As described hereinbefore, in this mode, an 'H' signal is output from the output terminal CF of the mode identification circuit 19. This signal goes through the OR gate OR3 and then is input to the AND gate AN15 to unblock the AND gate AN15. That is to say, the flash data transfer clock signal FCKS, in the same manner as in the FC mode, is input through the AND gate AN15 to the clock signal input terminal FSCK of the flash computer 12.

In the present mode, the 'H' signal output from the output terminal CF of the mode identification circuit 19 is inverted to 'L' through the inverter IN11 to block the AND gates AN17 and AN18, whereby the transistors Tr15 and Tr16 are turned 'OFF' and the electronic flash device FL becomes ready to receive data input from the camera body CA.

In this condition, if the data signal serially transferred through the signal line 12 from the camera body CA is input, this signal is inverted through the transistor Tr17 and again inverted through the inverter IN12 to regain its original state and is input to the serial data input terminal FSIN of the flash computer 12.

The FD mode will be described next.

A pulse signal, acting as the flash display start signal FDSS permitting the display device 4 of the camera body CA to display the flash photography information of the electronic flash device FL, is output from the output terminal PL1 of the flash computer 12. This flash display start signal FDSS is transferred to the camera body CA unless the mode is the above-described FC mode and the CF mode for the serial data transfer or the EC mode for controlling the exposure. In the FC mode and CF mode for the serial data transfer, a program, which will be described later, executed by the flash computer 12 inhibits the output of this flash display start signal FDSS. Also, in the EC mode for controlling the exposure, the 'H' signal output from the output terminal EC of the mode identification circuit 19 is inverted and input to the other terminal of an AND gate AN24. Thus, this AND gate AN24 is blocked and the pulse signal output from the output terminal PL1 of the flash computer 12 is not transferred to the camera body CA.

The charging of the main capacitor C2 and the illumination control of the flash light will be described hereinafter.

When a charged voltage in the main capacitor C2 reaches a given level which permits a flash light emission, the light emission section 17 outputs an 'H' charging completion signal CSS to be input to the input terminal IP19 of the flash computer 12. The flash computer 12, receiving this signal, outputs an 'H' signal through an output terminal DCC, whereby the NOR gate NOR2 outputs an 'L' signal, the boosting control transistor Tr3 is turned 'OFF' to stop the voltage boosting operation. The NOR gate NOR2 also directly receives the charging completion signal CSS output from the light emission section 17. Therefore, this signal also controls the boosting control transistor Tr3 to carry out the voltage boosting operation. That is to say, regardless of the charging condition, the output signal from the output terminal DCC is used for permitting the flash computer 12 to control the voltage boosting operation.

Further, the charging completion signal CSS output from the light emission section 17 is also input to an AND gate AN23. In the EC mode for controlling the exposure, the output signal from the output terminal EC of the mode identification circuit 19 is in the state of 'H', thus the AND gate AN23 is blocked and the AND gate AN23 outputs an 'H' signal when the charging of the main capacitor C2 is completed. In this condition, the output signal from the output terminal CF of the mode identification circuit 19 is in the state of 'L' and the AND gates AN17 and AN18 receiving this signal in its inverted 10 state are unblocked. Therefore, the 'H' output signal from this AND gate AN23 is transferred through the OR gate OR5 and through the signal line l2 to the camera body CA as an 'H' charging completion signal CES.

Unless the mode is the EC mode, the output signal from the output terminal EC of the mode identification circuit 19 is in the state of 'L' and the AND gate AN23 receiving this signal is blocked. That is to say, the charging completion signal CES is not transferred to the camera body CA except in the EC mode.

Operation for imitating and stopping the flash light emission will be described next.

If the charging of the main capacitor C2 is completed, the flash computer 12, receiving the charging completion signal CSS from the light emission section 17, switches an output terminal CHG to 'H'. An output signal of this terminal CHG is input to an AND gate AN20 thereby to unblock the gate thereof In this condition, if the X contact point SX is closed upon completion of travel of the preceding shutter curtain, an 'L' flash synchronous signal XTS is input through the signal line 1, whereby the transistor Tr12 is turned 'ON' and this transistor Tr12 outputs an 'H' signal. Also, when the test light emission switch S5 is closed, the transistor Tr12 is turned 'ON' and outputs an 'H' signal Therefore, in either case, the AND gate AN20 receiving the signal from the transistor Tr12 outputs an 'H' signal and the 'H' light emission start signal FSS is output through an OR gate OR6 to the light emission section 17, whereby a flash light emission is imitated.

The output signal from the transistor Tr12 is input also to an AND gate AN19. This AND gate AN19 receives the output signal from an output terminal CAI of the flash computer 12 in its inverted state. The output signal from this output terminal CAI is switched to 'H' when the electronic flash device FL is attached to the data transfer type camera body CA. That is to say, when the electronic flash device FL is not attached to the data transfer type main camera body CA but is employed independently (also when the camera body CA is not supplied with power) or when the device FL is attached to a non data-transfer-type main camera body CA, the AND gate AN19 is unblocked. Therefore, in this case, even if the charged voltage in the main capacitor C2 is not sufficient for the light emission operation, the output signal from the AND gate AN19 is switched to 'H' by closing the test light emission switch S5, whereby an 'H' light emission start signal FSS is output through an OR gate OR6 to the light emission section 17 and an light emission operation is carried out.

Further, the 'H' signal from the transistor Tr12 is input to the NOR gate NOR1, the NOR gate NOR1 outputs an 'L' signal and also the AND gate AN16 receiving this signal outputs an 'L' signal.

As described hereinbefore, in the EC mode, the AND gates AN17 and AN18 are unblocked and synchronously with the emission of the flash light the 'L' signal output from the AND gate AN16 is transferred through the OR gate OR5 and through the signal line l2 to the camera body CA as the 'L' light emission control star signal ASS.

After the light emission operation, regardless of the flash control mode, i.e. the TTL automatic light emission control mode, or the manual illumination mode, when the light emission quantity reaches a predetermined value, a timer circuit 20 outputs an 'H' signal, which is output through an OR gate OR7 to the light emission section 17 as a light emission stop signal FES. A reset terminal RE of this timer circuit 20 receives the output signal from the transistor Tr12, that is to say, the timer circuit 20 starts counting or measuring time when the transistor Tr12 outputs the 'H' signal and the light emission operation is started. The limit time to be counted in this timer circuit 20 varies in accordance with the set light emission quantity data transferred from an output terminal GNS of the flash computer 12 and the aforementioned 'H' signal is output when the timer circuit 20 counts a time in accordance with the set light data.

In the manual illumination mode, an output signal from an output terminal TTL/M of the flash computer 12 is in the state of 'L' and an AND gate AN21 is blocked. In this mode, therefore, the flash light emission operation is stopped by the flash stop signal FES output from the timer circuit 20 through an OR gate OR7 to the light emission section 17 when the light emission quantity reaches the set light emission quantity.

On the other hand, in the TTL automatic light emission control mode, the output signal from the output terminal TTL/M is in the state of 'H' and the X contact XS is closed, whereby the transistor Tr12 outputs an 'H' signal and the AND gate AN21 is unblocked. In this condition, if the 'H' light emission control signal AES is transferred from the camera body CA through the signal line 3, the output signal from the AND gate AN21 is switched to 'H' and the 'H' light emission stop signal or flash interruption signal FES is output through the OR gate OR7 to the light emission section 17. Therefore, the light emission operation is stopped or terminated at the earlier timing either of the timing when the light emission control completion signal AES is transferred or the timing when the light emission quantity emitted from light emitting portion of the electronic flash device FL reaches the set value.

In the light emission operation, the 'H' signal output from the OR gate OR6 is output as the light emission start signal FSS to the light emission section 17 and at the same time is converted into pulse through a one-shot pulse generating circuit OS4 and then is input to a set terminal S of an RS-flip-flop circuit RS1 provided for storing the light emission data, whereby the RS-flip-flop circuit RS1 is set and the output signal from its output terminal Q is switched to 'H'. This output signal is further input to an input terminal APOI of the flash computer 12 and the flash computer 12 judges that the light emission operation has taken place.

Thereafter, this judgement is repeatedly made. Thus, in order to avoid a misjudgement that the light emission operation has taken place when the electronic flashing device FL is again attached to the camera body CA or immediately after the previous judgement is made, an 'H' signal is output from an output terminal APRE of the flash computer 12 for a predetermined time period. This signal is converted into pulse through the one-shot pulse generating circuit OS5 and is input to the reset terminal R of the RS-flip-flop RS1, whereby the RS-flip-flop RS1 is reset.

Referring to the same figure, other reference marks respectively denote; 21 for a control circuit for the motor M3 varying the illumination angle, and 26 for a standard pulse generating circuit having a crystal oscillator 26a.

Figure 13:
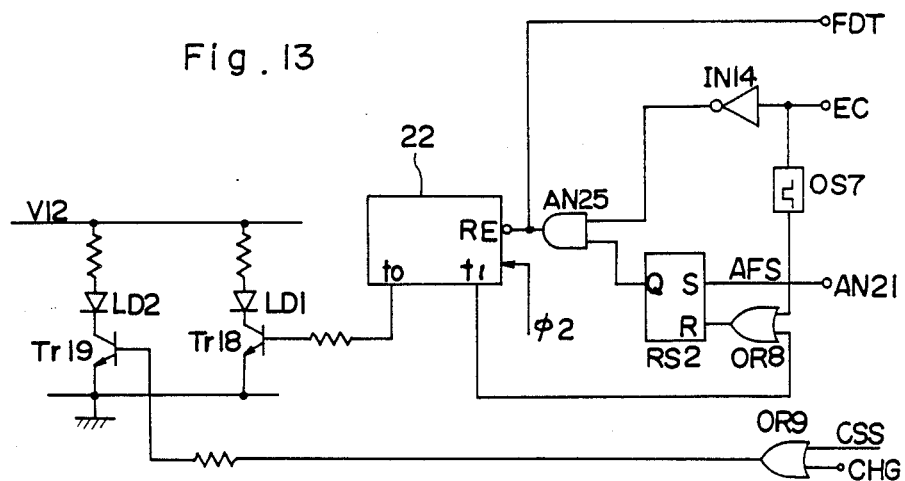
FIG. 13 is a circuit diagram showing the construction and function of a display section for a first preferred embodiment of the present invention.

The construction and functions of the display section 15 will be hereinafter described with reference to a circuit diagram in FIG. 13.

This display section 15 includes two LEDs LD1 and LD2 and a display control circuitry for controlling these displays.

The completion of charging of the main capacitor C2 is displayed by an illumination of the second LED LD2. This illumination of the second LED LD2 is carried out as an OR gate OR9 outputs an 'H' signal by receiving the charging completion signal CSS output from the light emission section 17 or the 'H' signal output from the output terminal CHG of the flash computer 12 and then the transistor Tr19 is turned 'ON'.

When the light emission control operation by the automatic light emission control device 10 of the camera body CA is completed, this is displayed by an illumination of the first LED LD1 This display of the completion of the light emission operation will be described next.

Before the mode enters into the EC mode for controlling the exposure, an RS-flip-flop RS2 is reset and the output signal from its output terminal Q is in the state of 'L'. Thus, an AND gate AN25 outputs an L signal and this signal is inverted and input to the reset terminal RE of a timer circuit 22 whereby the timer circuit 22 keeps its reset state. When the mode enters into the EC mode, the output signal from the output terminal EC of the mode identification circuit 19 is switched to 'H' This signal is inverted to 'L' through an inverter IN14 and then input to the AND gate AN25, but the output signal from the AND gate AN25 is maintained in the 'L' state and the timer circuit 22 keeps its reset state.

In this condition, if the AND gate AN21 in the control section 14 outputs an 'H' light emission control completion signal AFS as the light emission control completion signal AES output from the automatic light emission control circuit 10 of the camera body CA is input to the electronic flash device FL, 'H' signal AFS is input to the set terminal S of the RS-flip-flop circuit RS2, whereby the RS-flip-flop circuit RS2 is set and outputs an 'H' signal from its output terminal Q to unblock the AND gate AN25. Thereafter, when the EC mode ends with the completion of travel of the preceding shutter curtain, the output signal from the output terminal EC of the mode identification circuit 19 is switched to 'L'. This signal is inverted to 'H' through the inverter IN14 whereby the AND gate AN25 outputs an 'H' signal.

Thus, the reset state of the timer circuit 22 which receives this signal in the inverted state is released and the timer circuit 22 outputs an 'H' signal from an output terminal to for a predetermined time period (3 seconds), whereby the transistor Tr18 is turned 'ON' and the first LED LD1 is illuminated. The 'H' output signal from the AND gate AN25 is input also to an input terminal FDT of the flash computer 12 whereby the flash computer 12 judges that the light emission control operation is completed.

The timer circuit 22 counts the clock signal $\phi 2$ output from the clock signal output terminal FCLK of the flash computer 12 and then, after a predetermined time lapse, outputs an 'H' signal from an output terminal t1. This signal is input through an OR gate OR8 to the reset terminal R of the RS-flip-flop circuit RS2 thereby to reset the same, whereby the output signal from the AND gate AN25 is switched to 'L' and the timer circuit 22 is reset and then the first LED LD1 is deenergized to indicate the completion of the light emission control operation.

The functions of the electronic flash device FL constructed as described hereinbefore will be particularly described with reference to flow charts in FIGS. 14 through 17.

Figure 14:
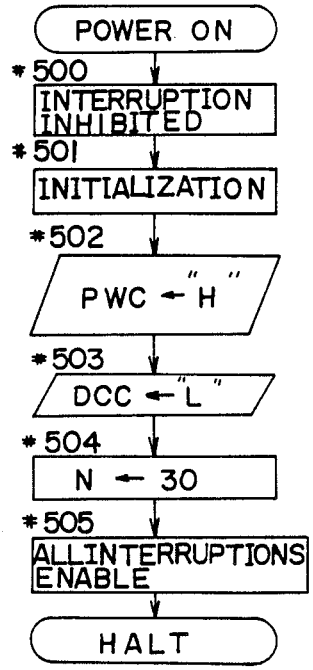
FIG. 14 is a flow chart showing operation of an electronic flash device when a main switch is closed.

The flow chart in FIG. 14 shows operation of the device FL when the main switch SM is closed.

The present electronic flash device FL may be started also by closing this main switch SM and this main switch SM, too, is an example of the switching means SSM according to the present invention.

When the main switch SM is closed, the flash computer 12 inhibits interruptions to this flow at step #500 and carries out an initialization of the data at step #501. More particularly, at this step #501, respective flags, which will be described later, are reset and the data to be transferred to the camera body CA are set such that the light emission quantity is set to its maximum, the illumination angle to satisfy the focal length fv of 28 mm, the illumination mode to the TTL automatic light emission control mode and the display unit to the meter unit display, and the third type identification signal to the zoom type, respectively.

It is to be noted that with the non-zoom type electronic flash device the programme is so adapted to set a predetermined guide number (see Table 1) at step corresponding to step #501.

At step #502, an output terminal PWC is switched to 'H' to turn 'ON' the power supply transistor Tr2, whereby the power supply to the control section 14 and to the display section 15 is started. At step #503, an output terminal DCC is switched to 'L' to turn 'ON' the voltage boosting control transistor Tr3, whereby the voltage boosting circuit 16 starts its operation. At step #504, a power supply hold time control counter N is set to 30. This counter N is adapted, as will be more particularly described later, to count one by one in a count interruption flow executed every 30 seconds and is normally set to 30 to set the power supply hold time of the electronic flash device FL to approximately 15 minutes.

The flash computer 12, after enabling all the interruptions at step #505, stops its operation. This flash computer 12 has the two interruption input terminals FINT1 and FINT 2. The terminal FINT1 is adapted for receiving the signal which indicates a start of the serial data transfer from the camera body CA and the terminal FINT 2 is adapted for receiving the 'L' signal from the AND gate AN22 when any one of the switches S6 through S10 of the group of the switches 23 is closed.

Firstly, operation carried out when the interruption to the interruption input terminal FINT 1 has taken place, will be described next with reference to the flow chart in FIGS. 15a, 15b, 15c.

As described hereinbefore, in the FC mode, the camera body CA transfers the 'H' camera mode signal CMS through the signal line 13 for the time period T1. The 'H' signal output from the output terminal CF of the mode identification circuit 19 receiving the signal CMS is converted into pulse through the one-shot pulse generating circuit OS3 and input to the interruption input terminal FINT1 of the flash computer 12, whereby the execution of this flow is started.

When the execution of this flow is started, the flash computer 12 enables the interruption to this flow from the interruption input terminal FINT 1 at step #600. Then, at steps #601 and #602, the interruption to the interruption input terminal FINT2 and the count interruption are inhibited.

At step #603, the output terminal PWC is switched to 'H',thereby to start the power supply to the control section 14 and to the display section 15. At step #604, the output terminal DCC is switched to'L'thereby to start the voltage boosting operation. At step #605, the respective output terminals are set based on the data initialized at step #501 or on the newly set data. For instance, the illumination mode is set at the output terminal TTL/M and the set light emission quantity data is set at the output terminal GNS, respectively and then the data are output therefrom. At step #606, the output terminal CAI is switched to 'H'. This operation is made for permitting the camera body CA to control the functions of the electronic flash device FL in unison with the charging completion signal CES transferred to the camera body CA.

That is to say, this step #606 is executed only when the interruption is made from the camera body CA. In this case, if the output terminal CAI is switched to 'H', the AND gate AN19 receiving the output signal from this terminal CAI in the inverted state is unblocked. Thus, when the electronic flash device FL is attached to the camera body CA as described above, the light emission operation by the device FL is enabled only when the output terminal CHG is switched to 'H' with the completion of the charging and the AND gate AN20 is unblocked.

At step #607, as the data indicating the necessity of the serial data transfer, the signal of the bit b3 indicating the charging condition, the signal of the bit b4 indicating the light emission control condition, the signal of the bit b0 indicating the mounting condition, and the two type identification signals of the bit b1 and the bit b5 are set respectively to a serial data transfer register SI0R. At step #608, synchronously with the flash data transfer clock signal FCKS and combined therewith, the data of the 8 bits b0 through b7 are serially transferred to the camera body CA.

In the same manner, the illumination data of the 7 bits b8, b9, b11, b12, b13, b14, b15 are respectively set to the serial data transfer register SI0R and synchronously with a rise of the flash data transfer clock signal FCKS and combined together with, the data of the 8 bits b8 through b15 are serially transferred to the camera body CA at step #609.

When the above two serial data transfers are completed, an output terminal SIORE is switched to 'H' at step #611, whereby the output signal from this terminal SIORE is input to the reset terminal RE of the mode identification circuit 19 thereby to reset the same 19.

At step #612, the flash computer 12 checks the state of the input terminal IP18 receiving the output signal from the output terminal CF of the mode identification circuit 19 and judges whether the camera mode signal CMS indicating the CF mode is transferred from the camera body CA or not. At steps #613 through #618, when it is judged that the mode enters into the CF mode as the input terminal IP18 is switched from 'L' to 'H', the flash computer 12 serially inputs the data signals serially transferred through the signal line 2 synchronously with the flash data transfer clock signal FCSK transferred through the signal line 3 from the camera computer 2.

In the respective data transfers, the data are transferred by eight bits one time and the flash computer 12, each time the same inputs the eight bits of data, stores this data in the predetermined register. The data transferred by the three serial data transfers executed at steps #613, #615, #617 include the control diaphragm aperture value Av, the exposure mode, the film speed value Sv, the focal length value fv of the photographic lens LE and the interval mode. When the above three serial data transfers are completed, in the same manner as in the FC mode, the output terminal SIORE is switched to 'H' in terms of pulse and the mode identification circuit 19 is reset at step #619 and then a data setting subroutine is called at step #620.

This data setting subroutine will be described next with reference to the flow chart in FIG. 17.

This routine is called and executed as the subroutine at step #620 or is executed as the interruption to the interruption input terminal FINT 2 of the flash computer 12 takes place. This interruption to the interruption input terminal FINT 2 takes place when any one of the switches S6 through S10 is closed as the electronic flash device FL is attached to the camera body CA which is not capable of transferring the signal to start the device FL or as the electronic flash device FL is used independently (also when the camera body is not supplied with power).

When the interruption to the interruption input terminal FINT2 takes place, firstly the output terminal PWC is switched to 'H' thereby to start the power supply to the control section 14 and to the display section 15 at step #801 and the output terminal DCC is switched to 'L' to start the voltage boosting operation at step #802. At step #803, an interruption flag FINT2F, which indicates that this execution is owing to the interruption to the interruption input terminal FINT2, is set to '1' and the process jumps to step #810. On the other hand, when this routine is called at step #620, the process jumps to step #810 after setting the interruption flag FINT2F to '0' at step #800.

At this step #810, it is judged based on the state of the output terminal IP15 whether or not the present mode is the FD mode for displaying the flash photography information of the electronic flash device FL. If it is judged that the mode is the FD mode as the input terminal IP15 is in the state of 'L' and any one of the switches S6 through S10 is closed, the state of the display flag DISF is judged at step #820. This flag DISF is set when the mode is switched to the FD mode. If it is judged that the present mode is already the FD mode as the display flag DISF is set, the process returns to the main routine.

If it is judged at step #820 that the display flag DISF is not set, it is determined that the mode has just entered into the FD mode. The flash computer 12 outputs two pulses from the output terminal PL1 at step #821. These pulse signals are transferred as the flash display start signal FDSS through the signal line 12 to the camera body CA thereby to indicate the start of the FD mode to the camera body CA. After setting the display flag DISF at step #822, the process goes on to steps #822 and #823. At step #823 through #830, the changed flash photography information is judged based on the states of the input terminal IP11 through IP14, the new data are set respectively.

At step #823, the state of the input terminal IP11 is judged. If it is judged that this terminal is in the state of 'L', it indicates that the illumination mode has been changed, then this data is changed at step #824 and the process goes on to step #621 of the main routine. On the other hand, if it is judged that the input terminal IP11 is in the state of 'H', the state of the input terminal IP12 is then judged at step #825. If this terminal IP12 is in the state of 'L', it indicates that the display unit has been changed, then this data is changed at step #826 and the process goes on to step #621 of the main routine.

If the input terminal IP12 is in the state of H', the state of the input terminal IP13 is then judged at step #827. If this terminal IP13 is in the state of '1', it indicates that the light emission quantity has been changed, then this data is changed at step #828 and the process goes on to step #621 of the main routine. It is to be noted that the change of this data is carried out step by step for each closure of the switch S8 in the order of the full light emission, the ¼ light emission, or from the ¼ light emission to the ⅛ light emission, full light emission . . . , and the data returns to its original state after the four changes.

If the input terminal IP13 is in the state of H', the state of the input terminal IP14 is then judged at step #829. If this terminal IP14 is in the state of 'L', it indicates that the illumination angle has been changed, then this data is changed at step #830 and the process goes on to step #621 of the main routine. The change of this data is also carried out step by step for each closure of the switch S9 in the order of fv=28 mm, fv=35 mm, fv=50 mm, fv=70 mm, the 'auto', fv=28 mm . . . , and the data returns to its original state after the five changes. In the case of the 'auto' to be more particularly described later, an illumination angle value fvA is automatically set which meets the focal length value fv of the photographic lens LE serially transferred from the camera body CA.

If the input terminal IP14 is in the state of 'H', it indicates that the display switch S10 is closed. This time, the data is not changed and the process goes on to step #621 of the main routine.

On the other hand, if it is judged at step #810 that the input terminal IP15 is in the state of 'H', it is determined that none of the switches S6 through S10 is closed, i.e. the present mode is not the FD mode, and the state of the display flag DISF is then judged at step #850. If it is judged that this display flag DISF is not set, the process goes on to step #621 of the main routine without carrying out any operations. On the other hand, if it is judged that the display flag DISF is set, the output terminal PL1 outputs two pulses at step #851. These pulses are transferred as the flash display completion signal FDES through the signal line 12 to the camera body CA thereby to indicate the end of the FD mode to the camera body CA. Thereafter, both the display flag DISF and the inputerruption flag FINT2F are reset at step #852 and the process goes on to step #621 of the main routine.

Referring back to FIG. 15a, at step #621a, the interruption to the interruption input terminal FINT2 is enabled and then at step #621b, a power supply hold time timer TF of the electronic flash device FL is reset and then this timer TF is restarted at step #622. That is to say, while this timer TF is carrying out the time measuring operation, the flow beginning from the next step #623 is executed, whereas if the interruption from the camera body CA to the interruption input terminal FINT 1 or the interruption to the interruption input terminal FINT2 for enabling the display of the flash photography information has taken place, it is expected that a photographic operation will be carried out soon. Thus, in order to permit the power supply hold time measurement of the electronic flash device FL to start upon the oncoming photographic operation, the timer TF is reset and restarted at steps #621 and #622. This process will be more particularly described later.

At step #623, it is judged whether the illumination angle is set to the 'auto' or not. If it is judged so, it is then judged at step #625 whether the photographic lens LE is attached or not. More specifically, this judgement is made based on the data about the control diaphragm aperture value Av input from the camera body CA at step #614. That is to say, as described hereinbefore, if the photographic lens LE is not attached, the control diaphragm aperture value Av is combined with the predetermined warning data and based on the existance of this warning data, it is judged whether the photographic lens LE is attached or not.

If it is judged that the photographic lens LE is attached, the illumination angle value fva, which meets a view angle corresponding to the focal length value fv of the photographic lens LE serially transferred at step #618, is set as the control illumination angle value fvA at step #626, and then the process goes on to step #628. On the other hand, if it is judged that the photographic lens LE is not attached, at step #627, the control illumination angle value fvA is set to a value fv0 which meets a view angle corresponding to the equation fv=28 mm, and then the process goes on to step #628.

Further, if it is judged at step #623 that the illumination angle is not set to the 'auto', a manually set illumination angle fvm is set as the control illumination angle fvA at step #624, and then the process goes on to step #628.

At this step #628, the flash computer 12 checks the state of the input terminal FDT and judges whether the automatic light emission control operation is completed or not. If it is judged that said operation is completed as the terminal FDT is in the state of 'H', the bitb4 having the data to be transferred to the camera body CA is set at step #629. On the other hand, if it is judged that this automatic light emission control operation is not completed as the input terminal FDT is in the state of 'L', the bit b4 is reset at step #630.

Next, the flash computer 12 varies the illumination angle in accordance with the focal length value fv of the photographic lens L. More specifically, this operation is carried out in a manner to be described hereinafter. A Xenon tube (not shown) acting as a light emission member is fixedly disposed and there is provided forwardly thereof a light projection head or plate (also not shown) to be movable relative to the Xenon tube. As this light projection plate is shifted in the fore and aft direction, the relative distance between the Xenon tube and the light projection plate is changed, i.e, the illumination angle is changed. This fore and aft shifting operation of the light projection plate is carried out by the motor M3 shown in FIG. 1 or FIG. 2B, which driving operation is controlled by the flash computer 12.

At steps #631 and #632, the control illumination angle value fvA set at steps #624, #626, #627 is compared with a illumination angle value fvN corresponding to the present position of the diffusion plate detected by the illumination angle detecting circuit 13. If it is judged at step #631 that the control illumination angle value fvA is greater than the present illumination angle value fvN (fvA>fvN), it indicates that the diffusion plate is presently displaced toward the wide angle side from the position corresponding to the focal length value fv of the photographic lens LE. In this case, the flash computer 12, at step #634, outputs through output terminals M01 and M02 a motor normal rotation signal to the motor drive control circuit 21 to drive the illumination angle change motor M3 in the normal rotation to shift the diffusion plate toward the telephoto side.

On the other hand, it is judged at step #632 that the control illumination angle value fvA is smaller than the present illumination angle value fvN (fvA<fvN), it indicates that the diffusion plate is displaced this time toward the telephoto side. In this case, the flash computer 12, at step #635, outputs through the output terminals M01 and M02 a motor reverse rotation control signal to the motor drive control circuit 21 to drive the illumination angle change motor M3 in the reverse rotation to shift the diffusion plate toward the wide angle side.

When either of the above motor rotation control signals is output to the illumination angle change motor M3, a motor drive flag MOTF, which indicates that the motor is in operation, is set at step #636, and then the process goes on to step #640.

If it is judged at step #631 or #632 that the control illumination angle value fvA is neither greater nor smaller than the illumination angle value fvN corresponding to the present position of the diffusion plate, it indicates that the diffusion plate is at present in a proper position to conform with the control illumination angle value fvA. In this case, the state of the motor drive flag MOTF is judged at step #633.

If it is judged that this flag MOTF is set to '1', i.e., the motor M3 is in operation, a motor stop control signal is output from the output terminals MO1 and MO2 to stop the motor M3 at step #638, the motor drive flag MOTF is reset at step #639 and then the process goes on to step #640. On the other hand, if it is judged that the motor drive flag MOTF is set to '0', i.e. the motor M3 is out of operation, a motor stop hold control signal is output from the output terminals MO1 and MO2 at step #637 to maintain the operating state of the motor M3 and then the process goes on to step #640.

At this step #640, it is judged based on the state of the input terminal IP19 whether the charging of the main capacitor C2 is completed or not. If it is judged that the charging is completed as the input terminal IP19 is in the state of 'H', the bit b3 having the data to be transferred to the camera body CA is set at step #641 and the process jumps to step #643. On the other hand, if it is judged that the charging is not completed as the input terminal IP19 is in the state of 'L', the bit b3 is reset at step #642 and then the process goes on to step #643.

At this step #643, it is judged based on the data input at step #618 whether the present photographic operation is the interval photographic operation controlled by the interval device IT or not. If it is judged the present operation is not the interval photographic operation, the process goes on to step #644 to judge whether three minutes have passed since the power supply hold time measuring timer TF is started at step #622. If it is judged that the three minutes have not yet passed, the process returns to step #623 and repeats the flow from steps #623 through #644. On the other hand, if it is judged that the three minutes have already passed, the process goes on to step #646.

If it is judged at step #643 that the present operation is the interval photographic operation, the process jumps to step #645 to judge whether one minute has already passed since the power supply hold time measuring timer TF is started at step #622. If it is judged that the one minute has not yet passed, in the same manner as above, the process returns to step #623 and then repeats the flow from steps #623 through #645. On the other hand, if it is judged at step #645 that the one minute has already passed, the process goes on to step #646.

At this step #646, it is judged based on the state of the interruption flag FINT2F whether this flow is executed owing to the interruption to the interruption input terminal FINT2 or not. If it is judged as the interruption flag FINT2F is set to '1', i.e. when the electronic flash device FL is attached to the camera body CA which is not capable of transferring the start signal to the device FL or when this electronic flash device FL is used independently (also when the camera body CA is not supplied with power) and any one of the switches S6 through S10 is operated, this flag FINT2F is reset at step #647, the power supply hold time control counter N is set to '24' at step #648, a count interruption is enabled at step #649 and then the process jumps to step #653.

On the other hand, if it is judged at step #646 that the present interruption is not made to the interruption input terminal FINT2 as the interruption flag FINT2F is set to '0', the output terminal DCC is switched to 'H' thereby to turn 'OFF' the voltage boosting transistor Tr3 at step #650, whereby the voltage boosting circuit 16 stops its operation. At step #651, the output terminal PWC is switched to 'L' thereby to turn 'OFF' the power supply transistor Tr2, whereby the power supply to the control section 14 and to the display section 15 is stopped and the respective components of the electronic flash device FL go out of operation. At step #652, the output terminal APRE is maintained at 'H' for a predetermined time period to reset the aforementioned illumination memory RS-flip-flop RS1 and then the process goes on to step #653.

At this step #653, all the output terminals except the above terminals DCC, PWC, APRE are switched to 'L'. At step #654, the interruption to the interruption input terminal FINT2 is enabled and the flash computer 12 stops.

The functions at the above steps #643 through #654 will be more particularly described next.

Figure 1:
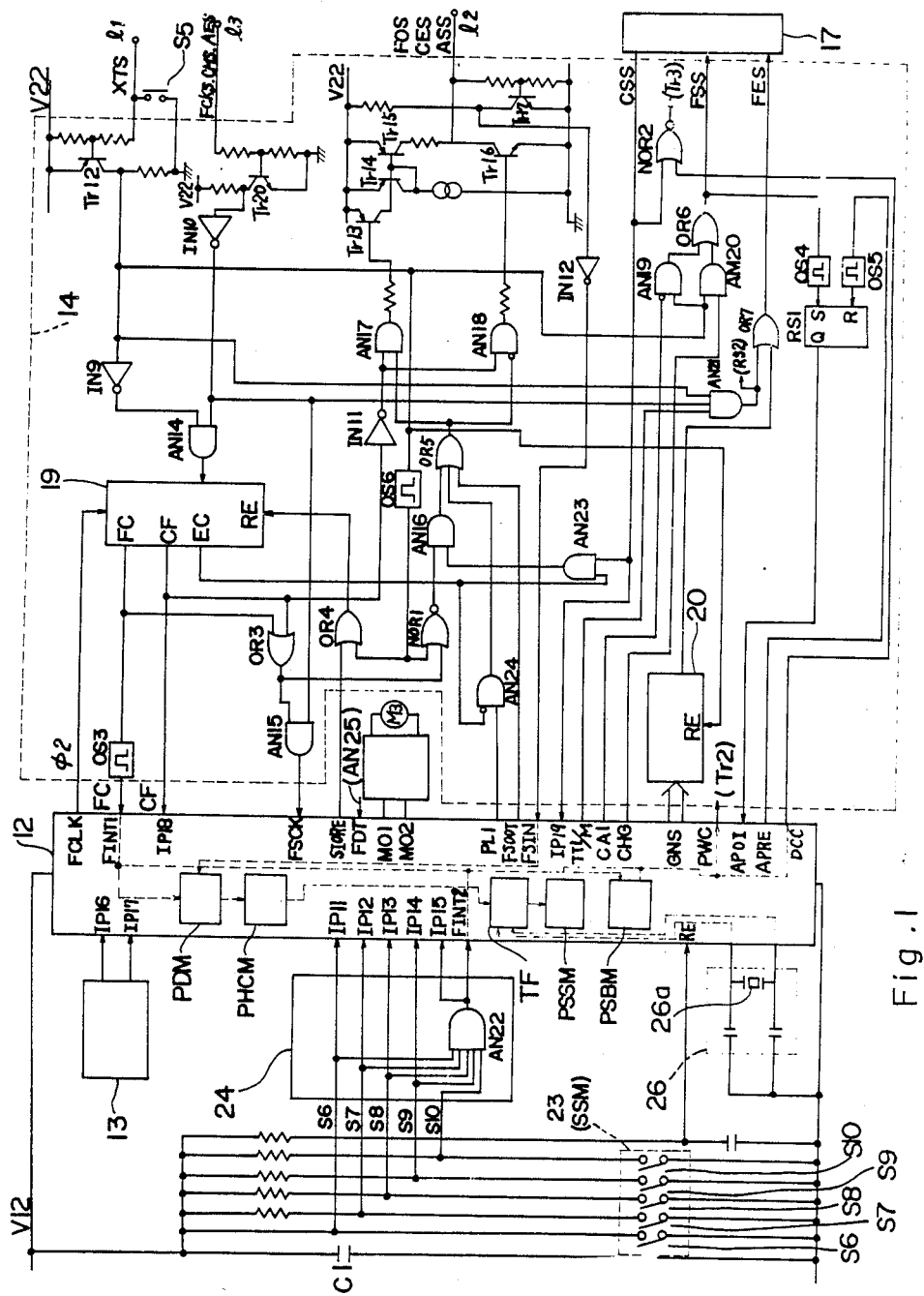
FIG. 1 is a circuit diagram for a group of switches and a control section for use in a first preferred embodiment of the present invention.

In the case of the interval photographic operation, when the one minute has passed since the power supply hold time measuring timer TF is started after the power supply to the electronic flash device FL is started by power supply start means PSBM in FIG. 1 as receiving a start signal CMS, the electronic flash device FL stops operating.

That is to say, in the interval photographic operation it is unnecessary and undesirable that the electronic flash device FL keeps operating for approximately 15 minutes, which is the normal power supply hold time, after one photographic operation with flash light emission is completed and its power source battery BA3 is wasted. Therefore, if start determination means PDM in FIG. 1 judges that the electronic flash device FL is started by receiving the camera mode signal CMS as a start signal controlled by the interval device IT by way of example of an interval controller and determines that the present operation is the interval photographic operation, the power supply hold time is adapted to be shorter than the normal by shortening the time-up period of the timer TF for operating power supply stop means PSSM by power supply hold control means PHCM.

This adjustment of the power supply hold time is made as specifically described hereinafter.

In the case of the interval photographic operation, as the interval device IT outputs the light measurement operation start signal PSS, an interruption is made to the camera computer 2. Then, the camera computer 2, in accordance with the programme, repeatedly transfers to the electronic flash device FL the camera mode signal CMS, as an example of a start signal, for indicating the FC mode. When the flash computer 12 receives this signal CMS, the power supply start means PSBM starts the electronic flash device FL to operate.

Figure 15B:
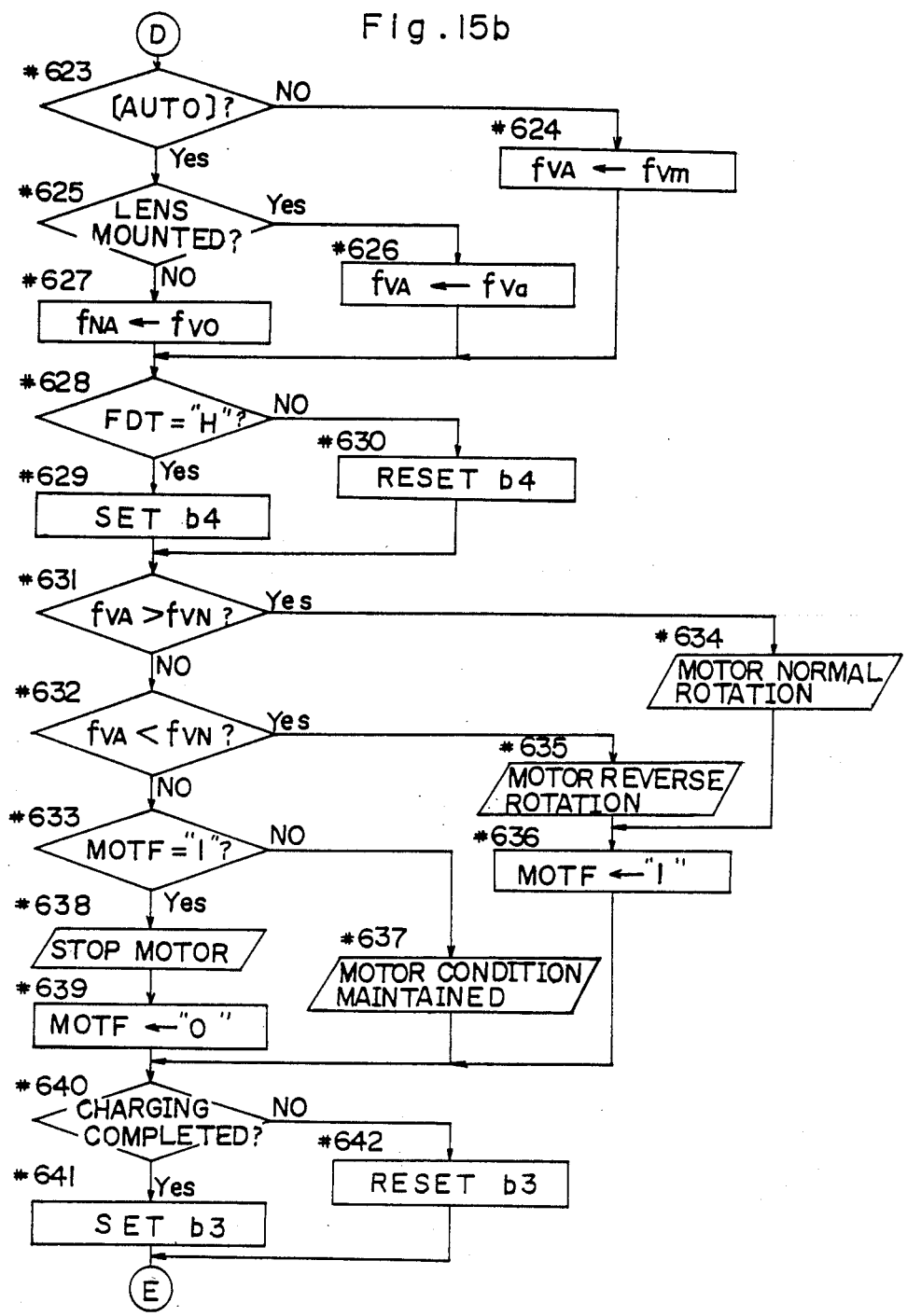
Figure 15C:
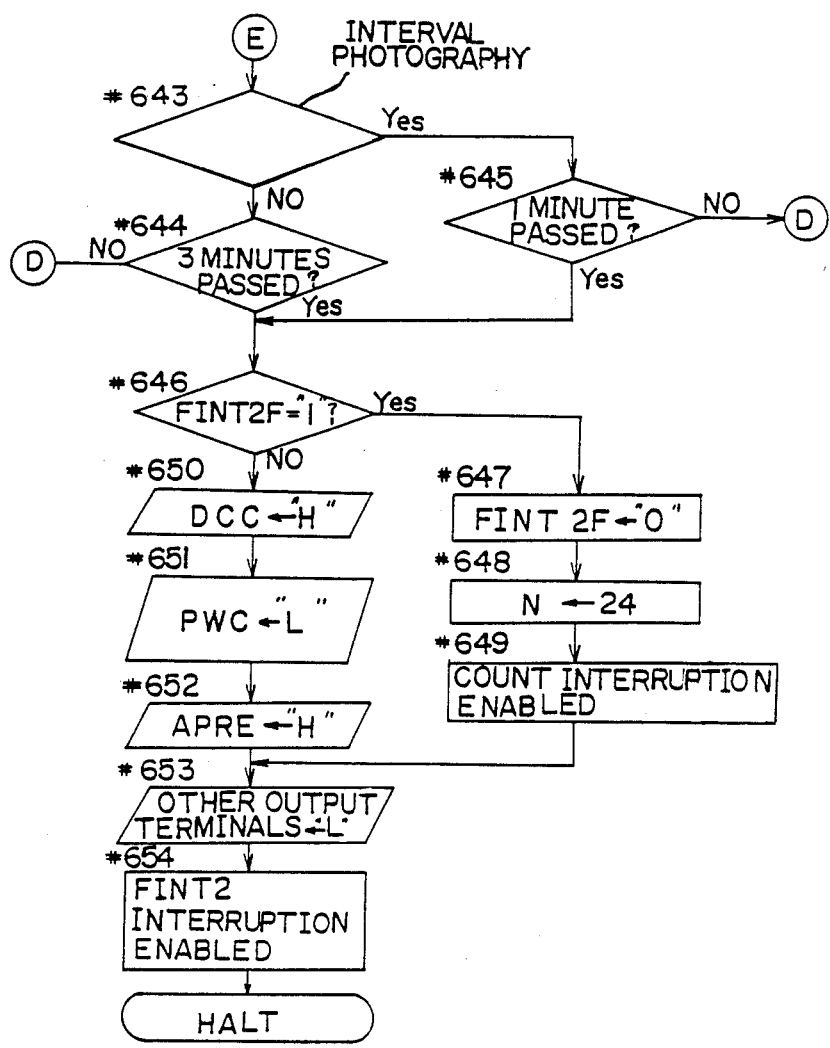

Thereafter, each time the flash computer 12 receives this signal CMS, an interruption is made to the interruption input terminal FINT1, whereby the flow shown in FIGS. 15a, 15b, 15c is executed. In this condition, the power supply hold time measuring timer TF is always reset and then restarted at steps #621 and #622, thus the process does not proceed to the flow beginning at step #646.

The camera computer 2 stops when ten seconds have passed since the same receives the light measurement start signal PSS from the interval device IT, whereby the interruptions to the flash computer 12 are inhibited and the flow from steps #623 through #645 is repeatedly executed. When one minute, at the latest, has passed since the light measurement start signal PSS is output, the interval device IT outputs a release signal RSS, whereby an interruption is again made to the camera computer 2 and accordingly thereto an interruption takes place to the flash computer 12 also, as described above. Thus, the power supply hold time measuring timer TF is again reset and restarted.

With this release signal RSS, a photographic operation is carried out. When this operation is completed, in the same manner as above, the camera computer 2 stops after the time lapse of 10 seconds, whereby the interruptions are not made to the flash computer 12 and the flow from steps #623 through #645 is executed, and then after the time lapse of one minute, the process executes flow beginning at step #650 through step #646, thereby to stop the electronic flash device FL. Therefore, in case of the interval photography, the power supply hold time for the electronic flash device FL after the completion of the operation is adapted to be approximately 1 minute and 10 seconds.

On the other hand, if it is not the interval photography and at the same time no interruption is made to the interruption input terminal FINT2 of the electronic flash device FL, that is to say, if the electronic flash device FL is attached to the camera body CA capable of transferring the start signal to the device FL, the electronic flash device FL is stopped after three minutes have passed since the timer TF is started.

With a combination of the electronic flash device FL and the camera body CA described in this embodiment, as the camera mode signal CMS is transferred as the start signal from the camera body CA to the electronic flash device FL, the device FL starts operating. In the case of this combination, in a different manner from the interval photography, the power of the power source battery BA3 of the electronic flash device FL is wasted if the electronic flash device FL keeps on operating approximately for the 15 minutes which is the normal power supply hold time.

That is to say, as long as the electronic flash device FL is in operation, the voltage boosting circuit 16 is turned 'ON' and 'OFF' repeatedly in order to boost the voltage in the main capacitor C2 up to the value needed for a light emission operation. And, with this repeated turning-'ON' and 'OFF', a great amount of electric current is generated and consequently the consumption of the battery BA3 is quickened. After the electronic flash device FL stops operating, the charged voltage in the main capacitor C2 is not reduced rapidly but is maintained at a level relatively close to the value needed for the light emission. Therefore, by restarting the electronic flash device FL, the charged voltage in the main capacitor C2 is recovered very quickly up to the requisite level. Moreover, in carrying out a photography, such operations as the determination of the exposure and focusing are necessary, thus, even if these operations are carried out automatically, it is possible to complete the charging to the main capacitor C2 in the course of these operations.

Therefore, in the above case, i.e. when the electronic flash device FL may be started by receiving the start signal transferred from the camera body CA, the power supply hold time is adapted to be shorter than the normal. More specifically, the time is set to approximately 3 minutes and 10 seconds since substantially the same operations as in the aforementioned interval photography are carried out.

In a case different from both of the above cases, i.e. when the electronic flash device FL is attached to the camera body CA which is not capable of transferring the start signal to the device FL or the electronic flash device FL is independently used (also when the camera body CA is not supplied with power) and when any one of the switches S6 through S10 is operated, based on the judgement made at step #646, the flow beginning at step #647 is executed. Since the power supply hold time control counter N is set to '24' at step #644 and this is combined with the 3 minutes measured at step #644, the power supply hold time, this time, amounts to approximately 15 minutes and 10 seconds.

Figure 16:
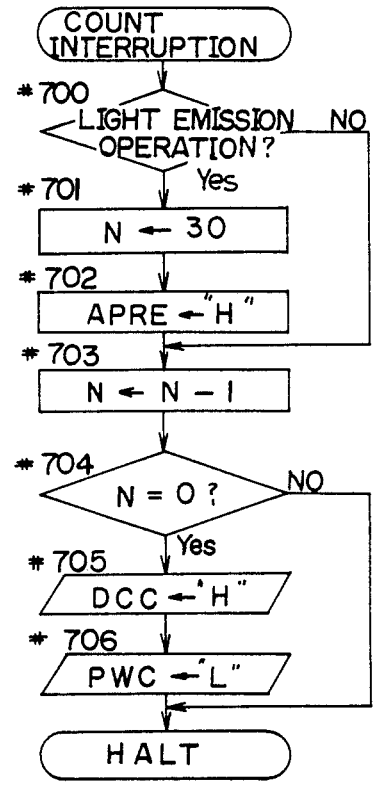
FIG. 16 is a flow chart showing operation in response to count interruption.

The operations in the case of the count interruption will be described next with reference to the flow chart in FIG. 16.

The interruption to this flow is made every 30 seconds if enabled after the power supply hold time control counter N is set.

When this interruption takes place, firstly at step #700, it is judged whether the light emission operation has been carrie out or not. This judgement is made, as described hereinbefore, by checking the state of the input terminal APOI of the flash computer 12 receiving the output signal from the illumination memory RS-flip-flop RS1.

If it is judged that the light emission operation has not taken place as the input terminal APOI is in the state of 'L', the process jumps to step #703. On the other hand, if it is judged that said operation has taken place as the terminal APOI is in the state of 'H', the power supply hold time control counter N is set to '30' at step #701, whereby from this time on the power supply hold time is newly set to 15 minutes each time the light emission operation takes place. Next, the output terminal APRE is maintained at 'H' for a predetermined time period in order to reset the illumination memory RS-flip-flop RS1 at step #702, the process goes on to step #703.

At this step #703, this power supply hold time control counter N is decremented by '1' and then at step #704, it is judged whether this counter N is now set to '0' or not. If not, the flash computer 12 stops. On the other hand, if it is judged that the counter N is now set to '0', the output terminal DCC is switched to 'L' at step #705, whereby the voltage boosting circuit 16 stops its boosting operation. At step #706, the output terminal PWC is switched to 'L', whereby, as described hereinbefore, the power supply to the control section 14 and to the display section 15 is stopped and the electronic flash device FL stops functioning and then the flash computer 12 stops.

Figure 18:
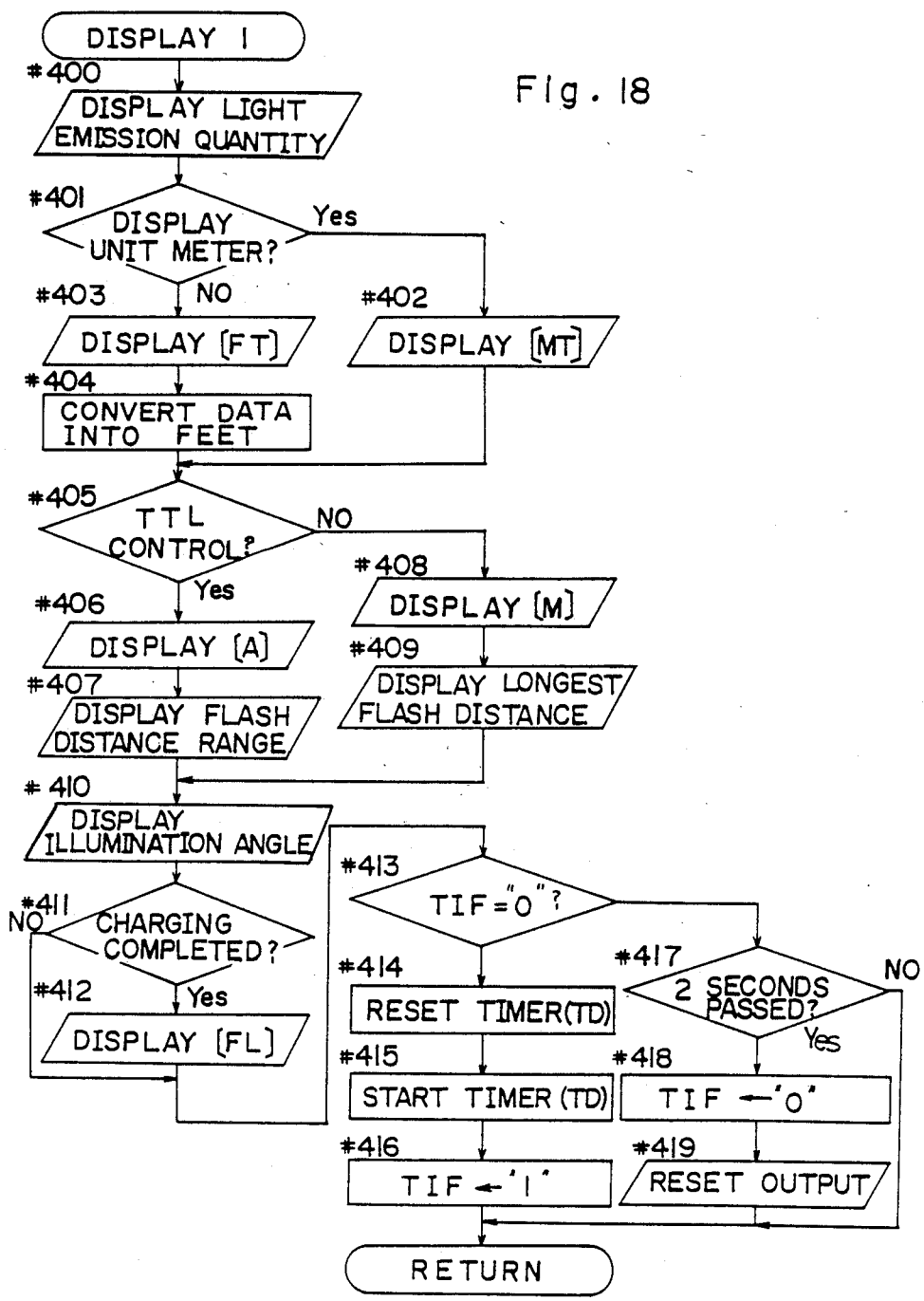
FIG. 18 is a flow chart showing a method for carrying out display operation for only a certain predetermined period of time.

In the above mentioned embodiment, the display device 4 of the camera body CA keeps displaying the flash photography information from the electronic flash device FL as long as the respective switches S6 through S10 are closed. Instead of this manner, it is also possible that this display operation is carried out only for a certain period of time. One method for this will be described next with reference to the flow chart in FIG. 18. This flow is a modification of the display 1 subroutine called at step #40 in the main routine of the camera computer 2.

The steps carrying out the same functions as in the display 1 subroutine hereinbefore described with reference to FIG. 8 will be provided with the same reference numerals and will not be particularly described.

Steps in this subroutine having different functions from those in the display 1 subroutine in the previous embodiment are in the flow beginning at step #413. That is to say, in the flow before step #412 where the completion of the charging in the main capacitor C2 of the electronic flash device FL is awaited at step #411 and then with this completion the character FL is displayed at step #412, the present subroutine does not differ from the display 1 subroutine in the previous embodiment in its functions.

At step #413, the camera computer 2 judges the state of a display identification flag TIF. This flag TIF is set when the display 1 subroutine is called for the first time. If it is judged that this subroutine is called for the first time as the flag TIF is set to '0', a display control timer TD is reset at step #414 and started at step #415 and then the display identification flag TIF is set to "1" at step #416 and the process returns to the main routine.

On the other hand, if it is judged at step #413 that the display identification flag TIF is set to '1', the process jumps to step #417 to judge whether 2 seconds have passed or not since the display control timer TD is started at step #415. If it is judged that the 2 seconds have not yet passed, the process returns to the main routine without carrying out any operations. If it is judged that the 2 seconds have already passed, the display identification flag TIF is reset at step #418 and then a pulse signal for resetting the RS-flip-flop RS3 shown in FIG. 12 is output at step #419, whereby the display operation is deenergized and then the process returns to the main routine. That is to say, though not shown, in this case, it is necessary to newly add a signal line extending to the reset terminal R of the RS-flip-flop RS3 shown in FIG. 12.

Still another embodiment will be described next.

In the previous embodiment, the display device 4 of the camera body CA displays all the flash photography information transferred from the electronic flash device FL. This means that unnecessary information except that needed for the daylight photographic operation (photography under daylight without using the electronic flash device FL) is also displayed thus this results in an increase in the number of the display segments and in a complification of the overall circuitry construction and consequently in a higher manufacturing cost of the camera body CA. The complification of the overall circuitry construction means a complification of the circuitry per se needed to handle the display segments and further a necessity of increased number of decoders for decoding and displaying the computed values obtained in the APEX system one by one (the information about the flash distance, or about the exposure time, or about the diaphragm aperture). The following alternate embodiment provides a solution to these problems.

The electronic flash device FL in this embodiment includes different switches from the group of switches 23 in the previous embodiment. More particularly, the switches S11 through S16 except the display switch S10 are adapted to be condition switches which conditions per se indicate the flash photography information of the electronic flash device FL and the information about the flash distance alone is displayed on the display device 4 of the camera body CA. Further, since this information about the flash distance substantially agree to the diaphragm aperture in its data sequence, the flash distance is displayed by using the decoder and the segment for displaying the diaphragm aperture.

To describe the similarity of these sequences of these two kinds of data, as well-known, the relationship among the F number of the photographic lens LE as diaphragm aperture, the object distance LN between the electronic flash device FL and the object to be photographed as flash distance, and the guide number GN which is the light emission quantity information for the electric flash device FL, may be expressed by the following equation (2).

$$GN = FN \times LN \qquad (2)$$

That is to say, if the light emission quantity is fixed, the diaphragm aperture value and the flash distance value are in inverse proportion to each other. The F number FN as the diaphragm aperture value varies as multiplied by $\sqrt{2}$ such as 1.4, 2, 2.8 and so on, thus the flash distance value obtained from the equation (2) also varies as multiplied by $\sqrt{2}$.

Figure 19:
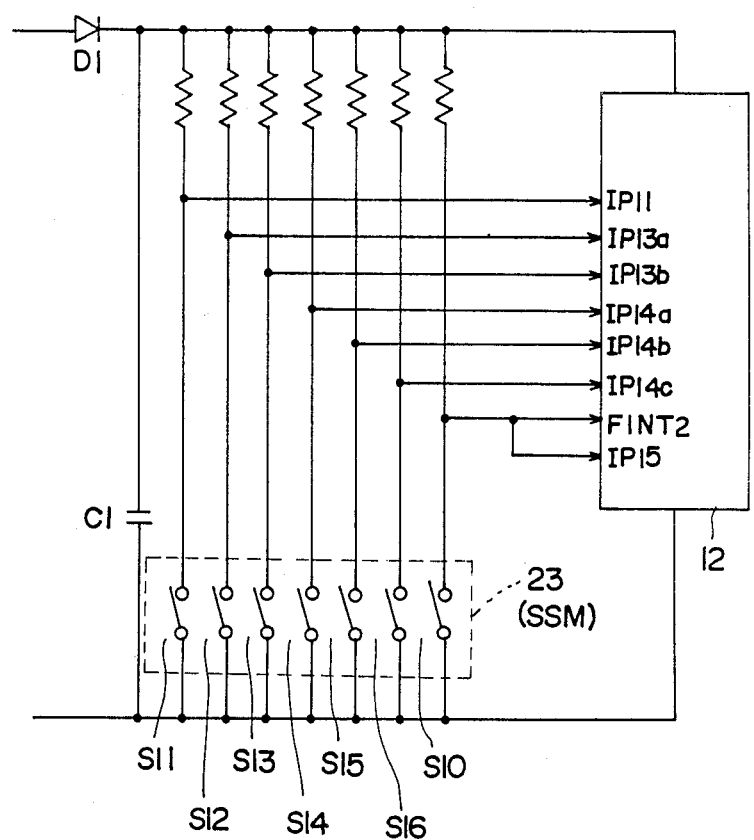
FIG. 19 is a circuit diagram showing construction of a group of switches of an electronic flash device according to a second embodiment of the present invention.

The construction of the group of switches 23 of the electronic flash device FL in this embodiment will be described next with reference to FIG. 19. It is to be noted that reference marks D1 and C1 respectively denote the same diode and the capacitor of the previous embodiment shown in FIG. 2B.

A reference mark S11 denotes an illumination mode change slide switch for indicating the TTL automatic light emission control mode or the manual illumination control mode, and indicates the TTL mode when closed. Reference marks S12 and S13 denote switches which states change in accordance with a setting of a light emission quantity change slide switch (not shown) for indicating the light emission quantity (full, $\frac{1}{2}$, $\frac{1}{4}$, $\frac{1}{8}$). Reference marks S14, S15, S16 denote switches a combination of which states change in accordance with the set illumination angle. The illumination angle varies step by step by means of a dial type illumination angle setting switch (not shown) step by step such as fv=28 mm, fv=35 mm, fv=50 mm, fv=70 mm, the auto.

The respective switches S11 through S16 are connected to the input terminals IP11, IP13a, IP13b, IP14a, IP14b, IP14c and state signals thereof are input to the flash computer 12.

A switch S10 has the same construction as the normal-open push type indication switch described in the previous embodiment. In this embodiment, when this display switch S10 is closed, the display device 4 of the camera body CA displays the flash distance. Also, this switch S10 is connected to the input terminal IP15 and the int input terminal FINT2 of the flash computer 12.

That is to say, when the flash computer 12 is in operation, the state of the input terminal IP15 is judged and based on this result, the flash display start signal FDSS or the flash display end signal FDES is transferred to the camera body CA. Further, when the electronic flash device FL is attached to the camera body CA which is not capable of outputting the start signal to the device FL or when the electronic flash device Fl is independently used (also when the camera body CA is not supplied with power), if this switch S10 is closed, the interruption is made to the interruption input terminal FINT2 and the flash computer 12 executes the predetermined interruption routine.

The construction of the electronic flash device in this embodiment is the same as that of the electronic flash device FL in the previous embodiment except the above-described construction of the group of switches 23. Also, the programme executed by the flash computer 12 varies to some extent in accordance with a change in the construction of the group of switches 23. Only the differences will be briefly described next.

First, in the flow shown in FIG. 14 executed when the main switch SM is closed, different kinds of data are set at step #501. That is to say, the data concerning the light emission quantity and the illumination mode, as indicated by the states of the respective switches S11 through S16 per se in this case, are not set. Also, the data concerning the display unit is not set since the same is displayed in the meter only.

In the flow shown in FIG. 15a, 15b, 15c executed when the interruption is made to the interruption input terminal FINT1, different functions are carried out at step #605. That is, in the previous embodiment the respective output terminals are set based on the data initialized at step #501 or on the newly set data, whereas in this embodiment, the respective input terminals IP11, IP13a, IP13b, IP14a, IP14b, IP14c are checked whereby the states of the respective switches S11 through S16 are judged and then the output terminals TTL/M and GNS are set based on the judged states of the respective switches S11 through S16.

Figure 17:
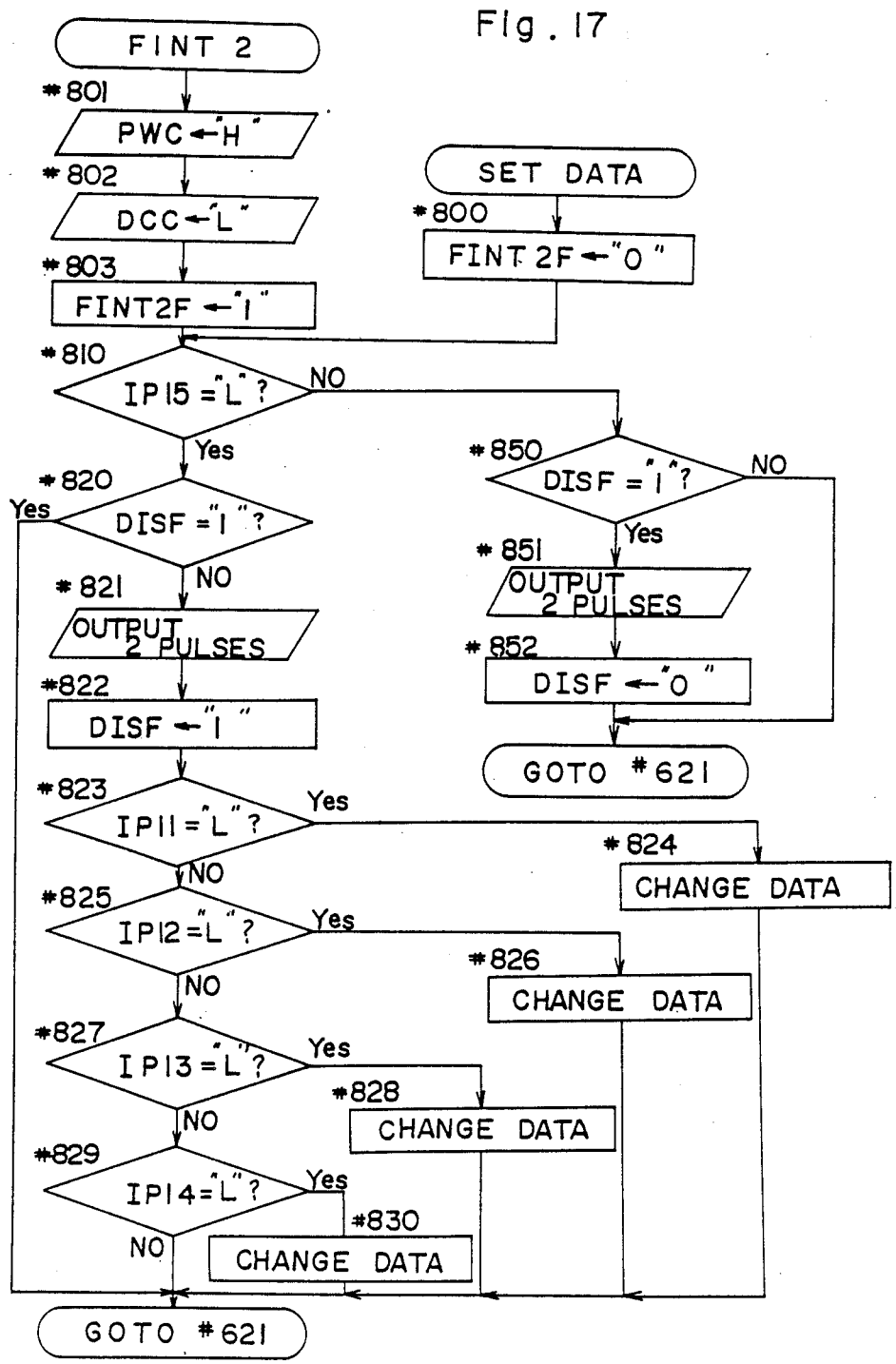
FIG. 17 is a flow chart showing a data setting subroutine.

The data setting subroutine illustrated in the flow chart in FIG. 17 in the previous embodiment is replaced by the flow chart shown in FIG. 20. The steps #823 through #830 for changing the data are not carried out and the display flag DISF is set to '1'at step #822, then the process directly goes on to step #621 of the main routine.

Except for the above-described differences, the flow chart of this embodiment is the same as that of the previous embodiment. Additionally, in the previous embodiment when the data are newly set, the flash display start signal FDSS for permitting the flash photography information display is always transferred to the camera body CA, whereas in this embodiment only by depressing the display switch S10 the flash display start signal FDSS is transferred to the camera body CA and the flash photography information is displayed thereby.

Differences in the construction of the camera body CA will be described next. There are changes n the contents of the display made by the display device 4 and the corresponding changes in the circuitry. The construction of the circuitry relates to the inner 'hardware' structure of the camera computer 2' therefore will not be shown but will only be described with reference to a flow chart executed for the display operations.

FIG. 21 shows a flow chart including a modification of the display 1 subroutine called at step #40 in the programme executed by the camera computer 2.

When this subroutine is called, the maximum flash distance value Dvmax computed by the flash distance calculation subroutine called at step #38 is set to a register AVR for displaying the diaphragm aperture information at step #450, then at step #451 this data set to the register AVR is decoded by the diaphragm aperture information display decoder and is displayed by means of segments for the diaphragm aperture information display. At step #452, a character 'm' indicating the meter unit display is displayed instead of the character 'F' which is displayed together with the 'F' number representing the diaphragm aperture information, and then the process returns to the main routine.

That is to say, the flash distance in the flash photography and the 'F' number representing the diaphragm aperture information have the same data sequence represented by geometrical series having a multiple of √2. Therefore, in the display device 4 of the camera body CA, the 'F' number representing the diaphragm aperture information and the flash distance in the flash photography are commonly displayed by the same display decoder and display segments, thereby to reduce manufacturing cost of the control unit of the camera body CA.

Though not shown, in this embodiment, the operation for displaying the character 'FL' is not executed in the display 2 subroutine and the display 3 subroutine is exactly same as in the previous embodiment.

Figure 22:
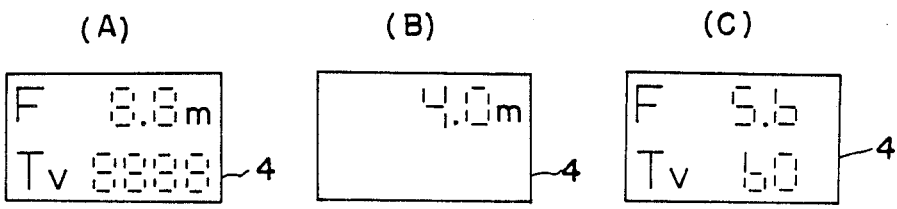
FIGS. 22(A)-22(C) show display operations of an LCD display according to the display subroutines of FIGS. 9, 10, and 21.

The display operations by means of LCD display executed in accordance with the respective display subroutines will be hereinafter described with reference to FIGS. 22(A) through 22(C). FIG. 22(A) shows an illustration of all segments to be displayed by the display 4.

FIG. 22(B) shows the display executed by the display 1 subroutine, wherein a mark 4.0m indicates that the maximum flash distance available for a flash photography is 4.0 m. FIG. 22(C) shows the display marks F 5.6 and Tv60 represent the control diaphragm aperture and the control exposure time, respectively.

Figure 3A:
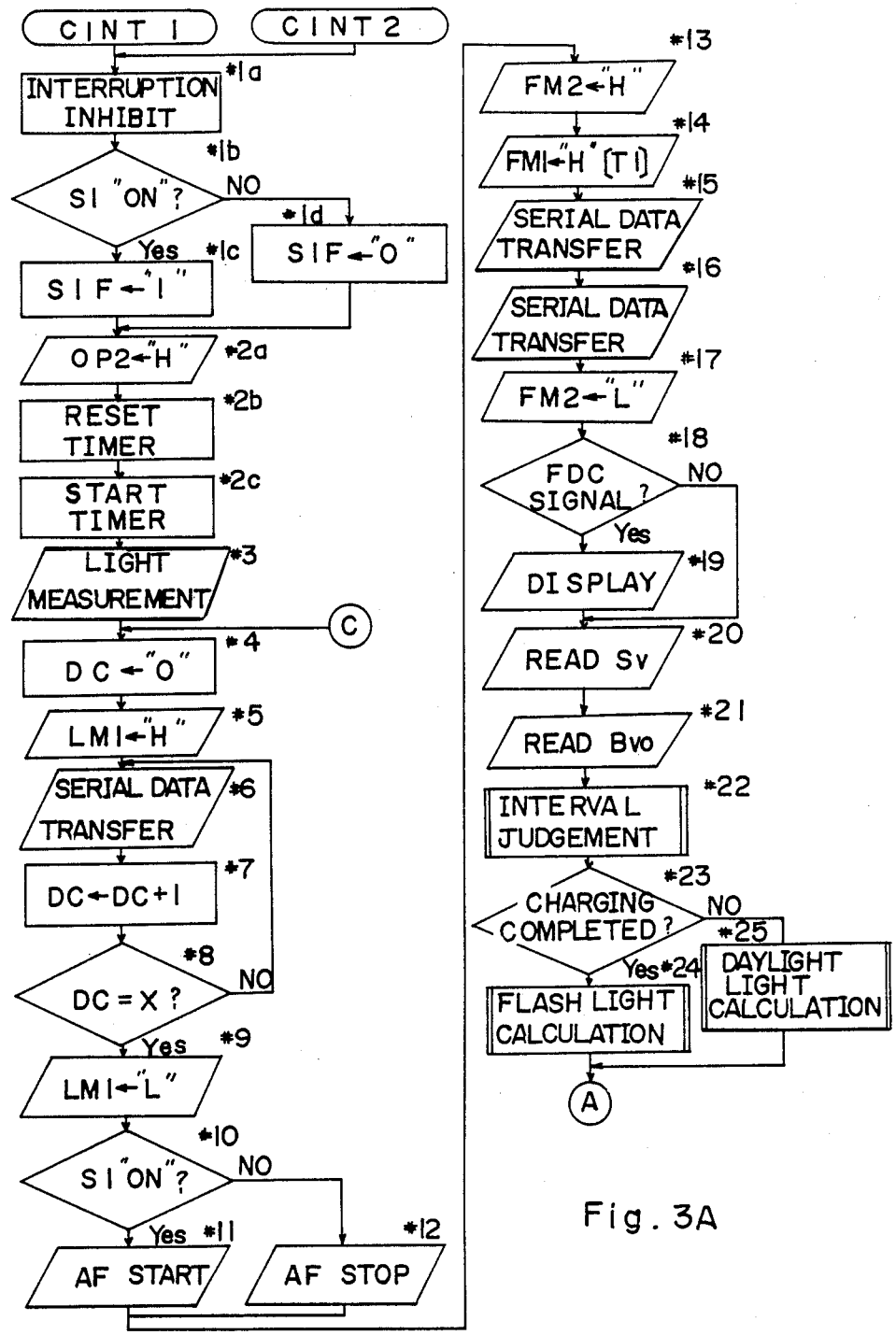
FIGS. 3-10 are flow charts showing the functioning of control circuitry of a camera body constructed according to a first preferred embodiment of the present invention.
Figure 3B:
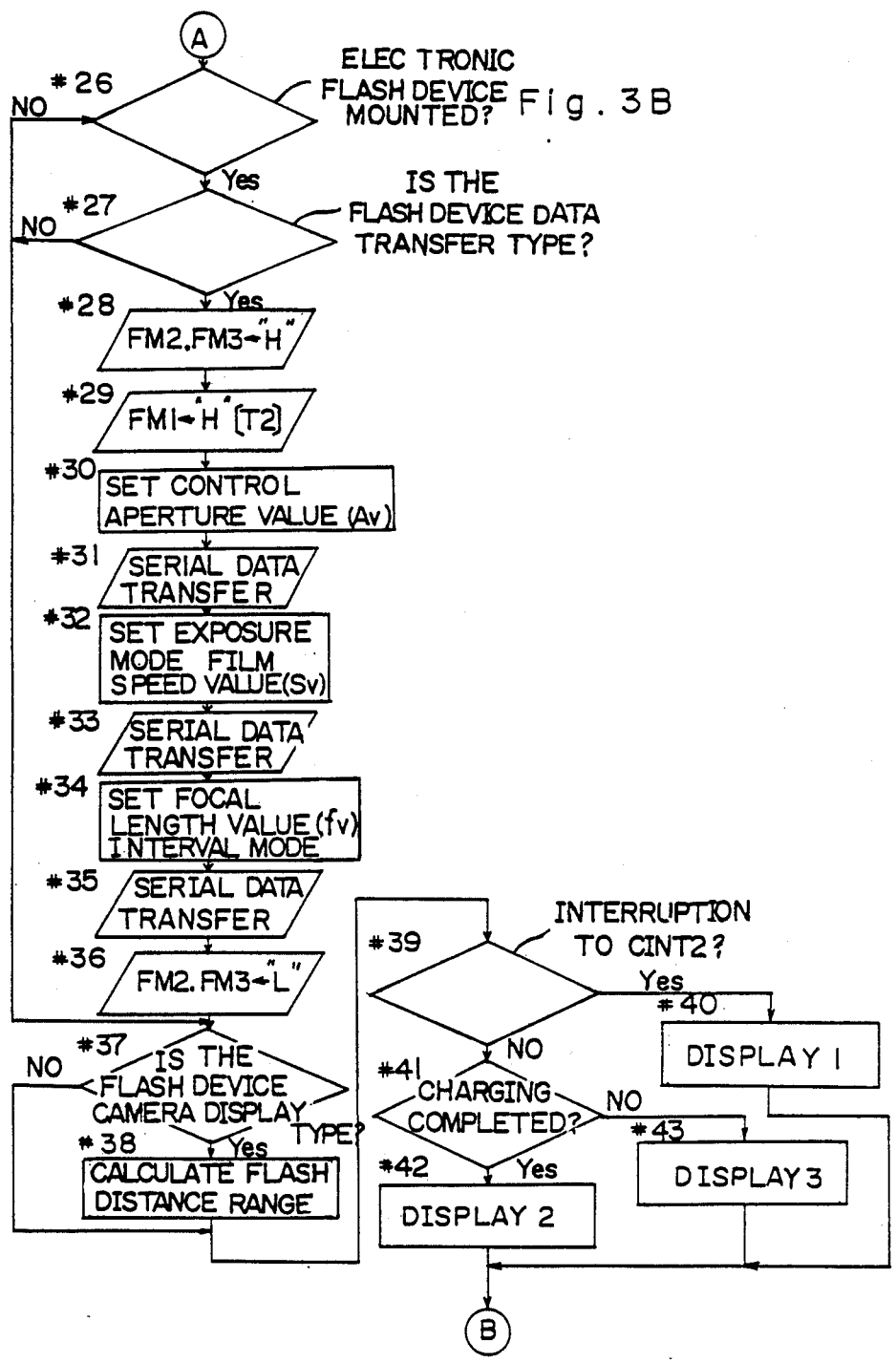
Figure 3C:
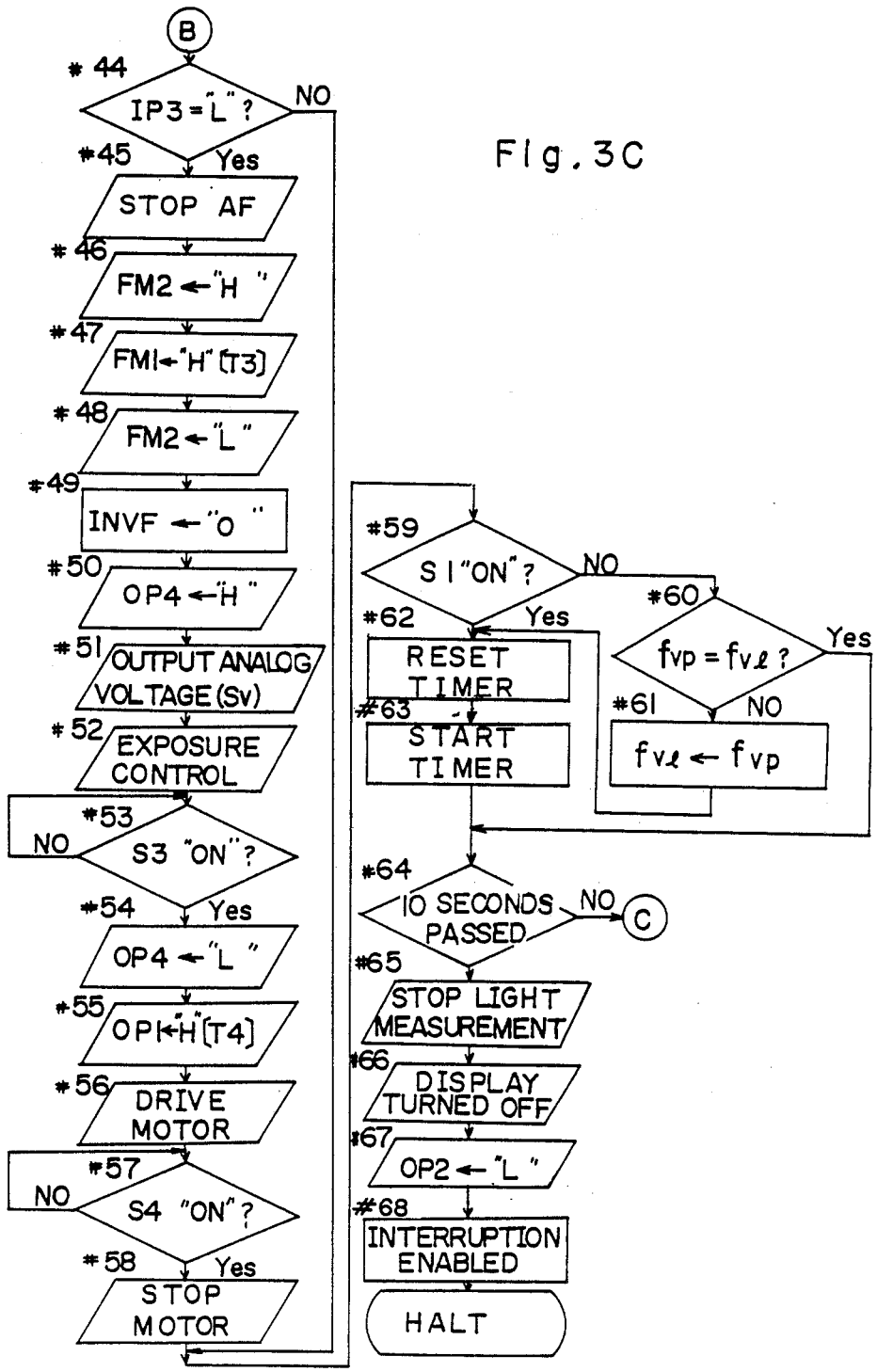

In these display operations, as described hereinbefore, the display operation for indicating the completion of the automatic light emission control operation at steps #18 and #19 in the flow chart shown in FIG. 3A is not carried out. Also, in this construction, only the maximum flash distance is displayed, thus the computation for obtaining the minimum flash distance Dvmin at step #321 in the flash distance calculation subroutine is not carried out and the minimum light emission quantity Ivmin is not set at step #313 or #316.

The calculation of the maximum flash distance value Dvmax will be described next. The relationship between the guide number GN and the light emission quantity value Iv when the ISO speed is 100 is shown in the following Table 4.

TABLE 4

| GN | ... | 2.8 | 3.3 | 4 | 4.8 |
|----|-----|-----|-----|---|-----|
| Iv | ... | −2.0 | −1.5 | −1.0 | −0.5 |
| GN | 5.6 | 6.7 | 8 | 9.5 | 11 |
| Iv | 0.0 | 0.5 | 1.0 | 1.5 | 2.0 |
| GN | 13 | 16 | 19 | 22 | ... |
| Iv | 2.5 | 3.0 | 3.5 | 4.0 | ... |

The maximum flash distance value Dvmax is obtained by using the light emission quantity values Iv shown in this Table. For example, if the ISO speed of the film is 100 (corresponding to the film speed value Sv of 5), the guide number of 11 represents a full light emission (corresponding to the maximum light emission value Ivmax of 2) and the 'F' number is 2.8 (corresponding to the diaphragm aperture value Av of 3), then $$Dvmax = Sv + Iv - Av \qquad (3)$$

Accordingly, the maximum flash distance value Dvmax of 4 is obtained from the above equation. In this condition, in the display operation by the display device 4, the maximum flash distance value Dvmax in accordance with the same system as this APEX system is decoded by means of the diaphragm aperture information display decoder and is displayed by 4.0 m corresponding thereto as shown in FIG. 22(B).

In the previous embodiment, the electronic flash device FL is stopped after about 1 minute and 10 seconds has passed since the completion of the photographic operation. In place of this, it is also possible that in the interval photography the electronic flash device FL is stopped when the flash computer 12 stops receiving the camera mode signal CMS as the camera computer 2 stops, that is, the power supply hold time is set to 10 seconds. In this way, the value of the power supply hold time may be conveniently varied.

It is also possible to permit the electronic flash device FL to stop operating regardless of the operation of the camera body CA upon completion of each flash light emission in the interval photography. In this case, FIG. 3c and FIG. 15c of the above embodiment need be slightly modified. Only the modified functions will be described next with reference to FIG. 23 and FIG. 24. The rest of the functions are the same as the above embodiment, therefore will not be described.

Figure 23:
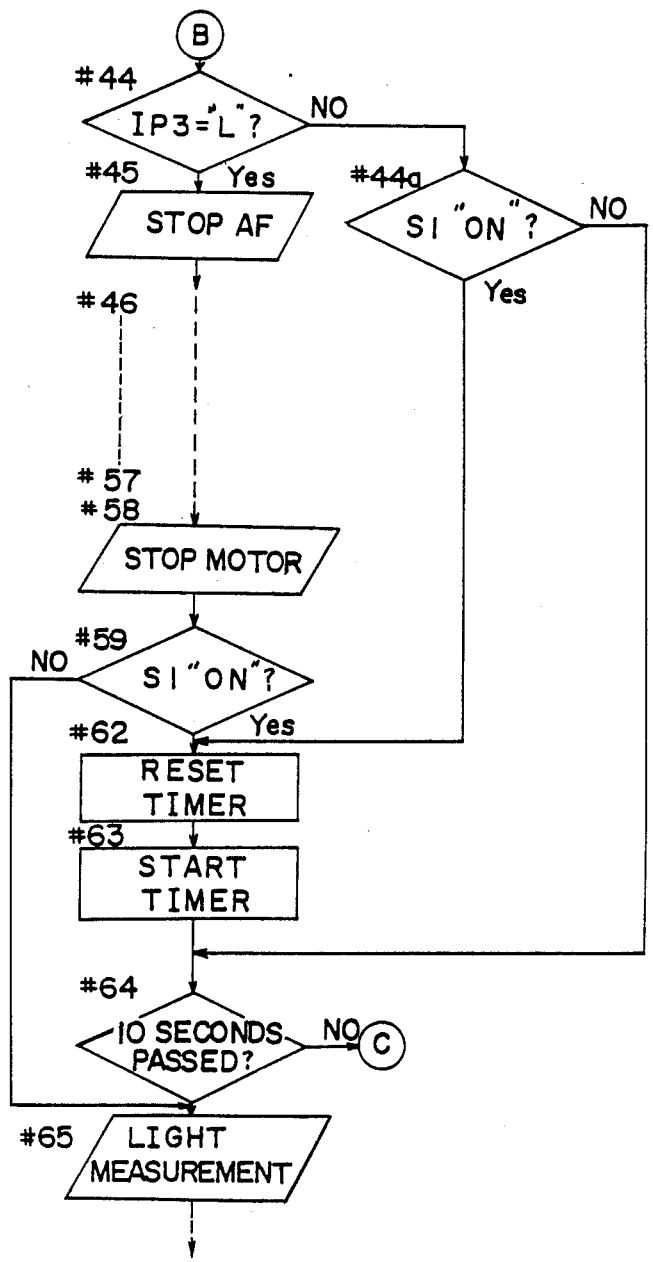
FIGS. 23 and 24 are flow charts showing subroutines modifying the operation of the second preferred embodiment of the invention.
Figure 24:
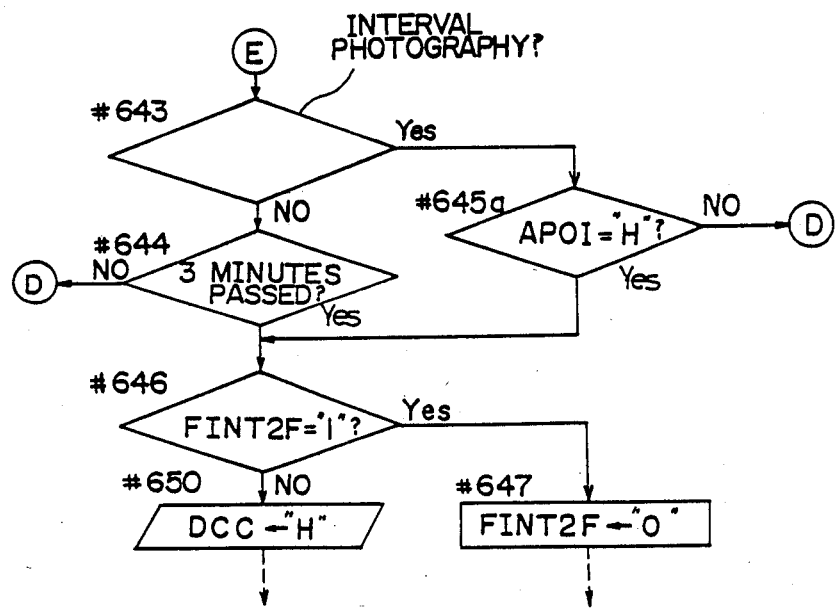

If it is judged at step #44 shown in FIG. 23 that the input terminal IP3 is in the state of 'H', i.e. the release switch S2 is opened and at the same time the release signal RS is not output from the interval device IT, the process goes on to step #44a. At this step #44a, it is judged whether the light measuring switch S1 is closed or not. If the switch S1 is closed, the process goes to step #62 to reset and then restart the timer TC. On the other hand, if it is judged that the switch S1 is opened, the process goes to step #64 to judge whether the timer TC has measured 10 seconds or not. If it is judged that the timer TC has not yet measured the 10 seconds, the process returns to step #4 to repeat the light measuring, display and calculating operations. If it is judged that the timer TC has measured the 10 seconds, the process goes to step #65 and then comes to halt. On the other hand, if it is judged at step #44 that the release switch S2 is closed or that the release signal RSS is output from the interval device IT, the aforementioned exposure control and film winding-up operations are carried out at steps #45 through #58 and then at step #59 it is judged whether the light measuring switch S1 is closed or not. If it is judged that this switch S1 is closed, the timer TC is reset and restarted at steps #62 and #63, and then the process returns to step #4. If it is judged that the light measuring switch S1 is opened, the process goes to step #65 and then comes to halt. That is to say, when the light measuring switch S1 is opened at the timing of the completion of the exposure control operation is completed as in the case when the exposure control operation is carried out by the release signal RSS output from the interval device IT, the camera computer 2 immediately stops and the power supply hold operation.

Further, when it is judged at step #643 that the present photographic operation is not the interval photography, the flash computer 12 of the electronic flash device FL judges at step #644 whether the timer TF has measured 3 minutes or not. If it is judged that the timer TF has not yet measured the 3 minutes, the process returns to step #623 to repeat the flow from steps #623 through #644. If it is judged that the timer TF has already measured the 3 minutes, the process proceeds to step #646 and comes to halt. On the other hand, if it is judged that the present photographic operation is the interval photography, it is judged at step #645a whether the input terminal APOI is in the state of 'H', i.e. the flash light emission operation has been carried out or not. If it is judged that said operation has been carried out, the process goes to step #646 to come to halt. If it is judged that said operation has not been carried out, the process returns to step #623 to repeat he flow from steps #623 through #643 and then at #645a. According to the above-described steps, in the interval photography, the computers of the camera body and of the electronic flash device are both stopped, thus the power consumption of the system may be further reduced.

Further, in the previous embodiment, the interval device IT acting as an interval controller is connected through the connecting portion JIc to the camera body CA. In place of this, the interval device IT may be integrated into the camera body CA or into the electronic flash device FL, thus the interval controller IT may be disposed in any convenient place.

What is claimed is:

1. A photographic camera system comprising a camera and an electronic flash device,
   (a) said electronic flash device including:
   (1) operational means for outputting a control signal in response to a manual operation,
   (2) light emission quantity information output means for outputting data corresponding to a light emission quantity, and
   (3) a first group of terminals for electrically connecting said electronic flash device to said camera and for providing the control signal and the light emission quantity data therethrough,
   (b) said camera including:
   (1) a second group of terminals electrically connected to said first group of terminals,
   (2) input means for inputting the control signal and the light emission quantity data through said second group of terminals,
   (3) a circuitry for carrying out preparatory operation for a photography, said circuitry including: calculation means for calculating a camera-to-object distance for a flash photography based on the light emission quantity data, diaphragm aperture value and film speed value, selector means for selecting either of the diaphragm aperture value and the camera-to-object distance, decoder means for decoding the selected data into data required for a value display and commonly used as a diaphragm aperture value display decoder and as a camera-to-object distance display decoder, and means for displaying the decoded data,
   (4) diaphragm aperture value input means for inputting a set or calculated diaphragm aperture value,
   (5) film speed input means for inputting a film speed value, and
   (6) control means for energizing said circuitry in response to an input of the control signal to said input means.

2. A display device for a photographic camera system comprising a camera and an electronic flash device,
   (a) said electronic flash device including:
   (1) light emission quantity information output means for outputting data corresponding to a light emission quantity, and
   (2) a group of terminals electrically connected to said camera and adapted for receiving the light emission quantity data,
   (b) said camera including:
   (1) a group of terminals electrically connected to said group of terminals for inputting the light emission quantity data,
   (2) diaphragm aperture value input means for inputting a set or calculated diaphragm aperture value,
   (3) film speed input means for inputting a film speed value,
   (4) calculation means for calculating a camera-to-object distance for a flash photography based on respective data from said light emission quantity output means, diaphragm aperture value input means and film speed input means,
   (5) selector means for selecting either of the diaphragm aperture value and the camera-to-object distance,
   (6) decoder means for decoding the selected data into data required for a value display and commonly used as a diaphragm aperture value display decoder and as a camera-to-object distance display decoder, and
   (7) means for displaying the decoded data.

3. A display device, as defined in claim 2, wherein said electronic flash device further includes selecting signal output means for outputting a signal commanding said selector means to select the camera- to-object distance and said selecting signal output means is connected through said groups of terminals to said selector means.

4. A display device for a photographic camera, comprising:
   (a) light emission quantity information output means for outputting data corresponding to a light emission quantity,
   (b) diaphragm aperture value input means for inputting a set or calculated diaphragm aperture value,
   (c) film speed input means for inputting a film speed value,
   (d) calculation means for calculating a camera-to-object distance for a flash photography based on respective data from said light emission quantity information output means, diaphragm aperture value input means and film speed input means,
   (e) selector means for selecting either of the diaphragm aperture value and the camera-to-object distance,
   (f) decoder means for decoding the selected data into data required for a value display and commonly used as a diaphragm aperture value display decoder and as a camera-to-object distance display decoder, said decoder means responsive to aperture value and said camera-to-object distance for display, and
   (g) display means for displaying the decoded data.

5. A photographic camera system comprising a camera and an electronic flash device detachably attached to said camera;
   (a) said electronic flash device including:
   a battery;
   first and second members manually operable independently;
   flash circuitry including a voltage boosting circuit for converting the voltage of said battery into a high voltage sufficient for flash light emission, processing means for carrying out a predetermined operation of said electronic flash device in response to manual operation of said first member, and signal output means for outputting a control signal in response to manual operation of said first member;

power supply control means for supplying the power of said battery to said flash circuitry such that at least said voltage boosting circuit is supplied with power with said second member being operated; and a first group of terminals to be electrically connected to said camera and for providing the control signal therethrough;

(b) said camera including:
a second group of terminals to be electrically connected to said first group of terminals;
camera circuitry for carrying out a predetermined operation of said camera;
a third member manually operable to energize said camera circuitry; and
means for permitting energization of said camera circuitry in response to an input of the control signal through said second group of terminals to said camera even when said third manual member is not operated.

6. A photographic camera system as defined in claim 5, wherein said camera circuitry includes a light measuring circuit.

7. A photographic camera system as defined in claim 5, wherein said signal output means additionally outputs a start signal to initiate the converting operation of said voltage boosting circuit.

8. A photographic camera system comprising a camera and an electronic flash device detachably attached to said camera, (a) said electronic flash device including:
a battery;
a voltage boosting circuit for converting the voltage of said battery into high voltage sufficient for flash light emission;
a first manually operable member;
output means for outputting a control signal in response to manual operation of said first member;
timer means for counting a predetermined period of time after the generation of the control signal;
input means for inputting a camera signal fed from said camera;
a first group of terminals to be electrically connected to said camera and through which the control signal and the camera signal are transmitted; and
control means for controlling the converting operation of said voltage boosting circuit such that the converting operation is maintained when said timer means has not counted the predetermined period of time but discontinued if when said timer counts the predetermined period of time, the timer means being cleared and restarted in response to the input of the camera signal to said input means;

(b) said camera including:
a second group of terminals to be electrically connected to said first group of terminals;
camera circuitry for carrying out a predetermined operation of said camera and outputting the camera signal through said second group of terminals to said electronic flash device; and means for initiating energization of said camera circuitry in response to an input of the control signal through said second group of terminals to said camera.

9. A photographic camera system comprising a camera and an electronic flash device detachably attached to said camera, (a) said electronic flash device including:
a first manually operable member;
signal output means for outputting a control signal in response to manual operation of said operable member; and
a first group of terminals to be electrically connected to said camera and for providing the control signal to said camera;

(b) said camera including:
a second group of terminals to be electrically connected to said first group of terminals;
display means for displaying predetermined information used for flash photography;
a second member manually operable to energize said display means;
means for permitting energization of said display means in response to an input of the control signal through said second group of terminals to said camera even when said second member is not operated.

10. A photographic camera system as defined in claim 9, wherein said electronic flash device further includes flash data output means for outputting flash data used for flash photography through said first group of terminals to said camera, the predetermined information being determined based on the flash data.

11. A photographic camera system comprising a camera and an electronic flash device detachably attachable to said camera, (a) said electronic flash device including:
a first manually operable member;
signal output means for outputting a control signal in response to manual operation of said first member;
input means for inputting camera data representing a focal length of an objective lens of said camera fed from said camera;
means for changing a light emission angle of said electronic flash device based on the camera data input to said input means; and
a first group of terminals to be electrically connected to said camera and through which the control signal and the camera data are transmitted;

(b) said camera including:
a second group of terminals to be electrically connected to said first group of terminals;
data output means for outputting the camera data through said second group of terminals to said electronic flash device;
a second member manually operable to energize said data output means; and
means for permitting energization of said data output means in response to an input of the control signal through said second group of terminals even when said second member is not operated.

12. A photographic camera system as defined in claim 11, wherein said electronic flash device further includes display means for displaying light emission angle information representing the light emission angle to be changed by said means for changing.

* * * * *